United States Patent
Lin

(10) Patent No.: US 12,361,923 B2
(45) Date of Patent: Jul. 15, 2025

(54) TRANSFORMING TEXT DATA INTO ACOUSTIC FEATURE

(71) Applicant: Tencent Technology (Shenzhen) Company Limited, Guangdong (CN)

(72) Inventor: Shilun Lin, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 324 days.

(21) Appl. No.: 18/071,379

(22) Filed: Nov. 29, 2022

(65) Prior Publication Data

US 2023/0087916 A1 Mar. 23, 2023

Related U.S. Application Data

(63) Continuation of application No. PCT/CN2022/085510, filed on Apr. 7, 2022.

(30) Foreign Application Priority Data

Apr. 19, 2021 (CN) .......................... 202110419629.X

(51) Int. Cl.
*G10L 13/047* (2013.01)
*G10L 13/08* (2013.01)
*G10L 15/16* (2006.01)

(52) U.S. Cl.
CPC ............ *G10L 13/047* (2013.01); *G10L 13/08* (2013.01); *G10L 15/16* (2013.01)

(58) Field of Classification Search
None
See application file for complete search history.

(56) References Cited

U.S. PATENT DOCUMENTS 11,069,335 B2 * 7/2021 Pollet ...................... G06F 16/24
11,574,624 B1 * 2/2023 Joly ....................... G10L 13/047
(Continued)

FOREIGN PATENT DOCUMENTS

CN 103700370 A 4/2014
CN 111798832 A 10/2020
(Continued)

OTHER PUBLICATIONS

International Search Report and Written Opinion in PCT/CN2022/085510, mailed Jul. 28, 2022, 14 pages.
(Continued)

*Primary Examiner* — Daniel C Washburn
*Assistant Examiner* — Tyler Becker
(74) *Attorney, Agent, or Firm* — ARENTFOX SCHIFF LLP

(57) ABSTRACT

A concealed text feature corresponding to a text data block of a plurality of text data blocks included in the text data and at least one concealed text feature corresponding to at least one text data block subsequent to the text data block are generated. A coarse fusion is performed on (i) the concealed text feature corresponding to the text data block and (ii) the at least one concealed text feature corresponding to the at least one text data block subsequent to the text data block to obtain at least one coarse fusion text feature. A fine fusion is performed on the at least one coarse fusion text feature to obtain a fine fusion text feature corresponding to the text data block. A length corresponding to the fine fusion text feature is regulated. The fine fusion text feature with the regulated length is transformed into the acoustic feature.

20 Claims, 16 Drawing Sheets

(56) References Cited

U.S. PATENT DOCUMENTS

2013/0289998 A1 10/2013 Eller et al.
2020/0372897 A1 11/2020 Battenberg et al.
2020/0402497 A1 12/2020 Semenov et al.

FOREIGN PATENT DOCUMENTS

| CN | 111968618 A | * | 11/2020 | ............ G10L 13/02 |
| CN | 112133282 A | | 12/2020 | |
| CN | 112542153 A | * | 3/2021 | ............ G10L 13/02 |
| CN | 109285537 B | * | 4/2021 | ............ G10L 13/04 |
| CN | 113761841 A | | 12/2021 | |

OTHER PUBLICATIONS

Lin, Shilun, "NANA-HDR: A Non-attentive Non-autoregressive Hybrid Model for TTS," arxiv.org/abs/2109.13673, Sep. 28, 2021, 8 pages.

Extended European Search Report and Search Opinion received for European Application No. 22790866.2, mailed on Apr. 29, 2024, 8 pages.

* cited by examiner

200

S201 — For each text data block in a plurality of text data blocks, obtain, through a neural network model, a concealed text feature corresponding to the text data block and a concealed text feature corresponding to at least one text data block subsequent to the text data block; the concealed text feature being a feature vector generated in the neural network model and not a final output; perform coarse fusion processing on the concealed text feature corresponding to the text data block and the concealed text feature corresponding to the at least one text data block subsequent to the text data block to obtain at least one coarse fusion text feature; and perform fine fusion processing on the at least one coarse fusion text feature to obtain a fine fusion text feature corresponding to the text data block S202 — Regulate a length corresponding to the fine fusion text feature S203 — Transform the fine fusion text feature with the regulated length into the acoustic feature

S201 — For each text data block in a plurality of text data blocks, obtain, through a neural network model, a concealed text feature corresponding to the text data block and a concealed text feature corresponding to at least one text data block subsequent to the text data block; the concealed text feature being a feature vector generated in the neural network model and not a final output; perform coarse fusion processing on the concealed text feature corresponding to the text data block and the concealed text feature corresponding to the at least one text data block subsequent to the text data block to obtain at least one coarse fusion text feature; and perform fine fusion processing on the at least one coarse fusion text feature to obtain a fine fusion text feature corresponding to the text data block S202 — Regulate a length corresponding to the fine fusion text feature S203 — Transform the fine fusion text feature with the regulated length into the acoustic feature S204 — Combine a plurality of acoustic features corresponding to the plurality of text data blocks to generate a combined acoustic feature S205 — Perform linear adjustment on the combined acoustic feature

FIG. 8B

TRANSFORMING TEXT DATA INTO ACOUSTIC FEATURE

RELATED APPLICATIONS

The present application is a continuation of International Application No. PCT/CN2022/085510, entitled "METHOD FOR TRANSFORMING TEXT DATA INTO ACOUSTIC FEATURE, ELECTRONIC DEVICE AND STORAGE MEDIUM" and filed on Apr. 7, 2022, which claims priority to Chinese Patent Application No. 202110419629.X, entitled "METHOD FOR TRANSFORMING TEXT DATA INTO ACOUSTIC FEATURE, ELECTRONIC DEVICE AND STORAGE MEDIUM", and filed on Apr. 19, 2021. The entire disclosures of the prior applications are hereby incorporated by reference in their entirety.

FIELD OF THE TECHNOLOGY

The present disclosure relates to the technical field of artificial intelligence, including a method for transforming text data into an acoustic feature, an electronic device, and a computer readable storage medium.

BACKGROUND OF THE DISCLOSURE

At present, a text-to-speech (TTS) technology has been provided to transform text data into speech. The TTS technology intelligently converts words into a natural speech stream through the design of a neural network by using the linguistics and the psychology simultaneously. However, the current TTS technology still has the problems that synthesized speech is unnatural in tonality pause, has machine tunes and misses words and sentences, and there is still an obvious difference between the speech synthesized through the TTS technology and speech read aloud by real people.

At present, a neural network model involved in the TTS technology is typically based on an attentive mechanism. The attentive mechanism inputs a sequence encoded by an encoder and an attention weight encoded by an attention layer into a decoder, which can well improve the capability of processing the text data of the TTS technology and improve the efficiency of the neural network model. The encoder and the decoder in the neural network model using the attentive mechanism are usually of the same architecture, for example, both are based on a transformer architecture. At present, an autoregressive neural network model is further provided to improve the quality of synthesized speech.

SUMMARY

Embodiments of the present disclosure provide a method for transforming text data into an acoustic feature, an electronic device and a non-transitory computer-readable storage medium.

According to an aspect of the disclosure, a method for transforming text data into an acoustic feature based on an acoustic apparatus is provide. In the method, (i) a concealed text feature corresponding to a text data block of a plurality of text data blocks included in the text data and (ii) at least one concealed text feature corresponding to at least one text data block subsequent to the text data block are generated. The concealed text feature corresponding to the text data block is a feature vector that is an output of an intermediate layer of a neural network of the acoustic apparatus and indicates a text feature of the text data block. A coarse fusion is performed on (i) the concealed text feature corresponding to the text data block and (ii) the at least one concealed text feature corresponding to the at least one text data block subsequent to the text data block to obtain at least one coarse fusion text feature, where the coarse fusion is performed based on a linear processing. A fine fusion is performed on the at least one coarse fusion text feature to obtain a fine fusion text feature corresponding to the text data block, where the fine fusion is performed based on at least one trainable hidden layer of the neural network of the acoustic apparatus. A length corresponding to the fine fusion text feature is regulated. The fine fusion text feature with the regulated length is transformed into the acoustic feature.

According to another aspect of the disclosure, an apparatus for transforming text data into an acoustic feature is provided. The apparatus includes processing circuitry. The processing circuitry is configured to generate a concealed text feature corresponding to a text data block of a plurality of text data blocks included in the text data and at least one concealed text feature corresponding to at least one text data block subsequent to the text data block. The concealed text feature corresponding to the text data block is a feature vector that is an output of an intermediate layer of a neural network of the acoustic apparatus and indicates a text feature of the text data block. The processing circuitry is configured to perform a coarse fusion on the concealed text feature corresponding to the text data block and the at least one concealed text feature corresponding to the at least one text data block subsequent to the text data block to obtain at least one coarse fusion text feature, where the coarse fusion is performed based on a linear processing. The processing circuitry is configured to perform a fine fusion on the at least one coarse fusion text feature to obtain a fine fusion text feature corresponding to the text data block, where the fine fusion is performed based on at least one trainable hidden layer of the neural network of the acoustic apparatus. The processing circuitry is further configured to regulate a length corresponding to the fine fusion text feature, and transform the fine fusion text feature with the regulated length into the acoustic feature.

Aspects of the disclosure also provide a non-transitory computer-readable medium storing instructions which, when executed by at least one processor, cause the at least one processor to perform a method of transforming text data into an acoustic feature. In the method, (i) a concealed text feature corresponding to a text data block of a plurality of text data blocks included in the text data and (ii) at least one concealed text feature corresponding to at least one text data block subsequent to the text data block are generated. The concealed text feature corresponding to the text data block is a feature vector that is an output of an intermediate layer of a neural network of the acoustic apparatus and indicates a text feature of the text data block. A coarse fusion is performed on (i) the concealed text feature corresponding to the text data block and (ii) the at least one concealed text feature corresponding to the at least one text data block subsequent to the text data block to obtain at least one coarse fusion text feature, where the coarse fusion is performed based on a linear processing. A fine fusion is performed on the at least one coarse fusion text feature to obtain a fine fusion text feature corresponding to the text data block, where the fine fusion is performed based on at least one trainable hidden layer of the neural network of the acoustic apparatus. A length corresponding to the fine fusion text feature is regulated. The fine fusion text feature with the regulated length is transformed into the acoustic feature.

According to the method for transforming the text data into the acoustic feature provided by the embodiment of the present disclosure, a fusion process of text features corresponding to the text data is learned by utilizing a dense-fuse encoder capable of densely connecting a plurality of transformers and a multi-head attention layer, so that the accuracy and richness of the extracted acoustic feature are improved, and natural synthesized speech can be generated robustly.

In the embodiment of the present disclosure, a length regulator is further utilized to replace an attention layer between an encoder and a decoder to overcome the influence of instability caused by the attention layer, so that the natural synthesized speech can be generated robustly.

In the embodiment of the present disclosure, a decoder of a non-autoregressive single-layer RNN structure is further utilized to reduce the adverse influence caused by exposure bias and local information preference, so that the decoding efficiency of the decoder and the accuracy of the decoded acoustic feature are improved.

BRIEF DESCRIPTION OF THE DRAWINGS

To describe the technical solutions of the embodiments of the present utility model more clearly, the following briefly introduces the accompanying drawings required for describing the embodiments. The accompanying drawings described below are only exemplary embodiments of this disclosure.

FIG. 2 is a flowchart showing a method for transforming text data into an acoustic feature according to an embodiment of the present disclosure.

FIG. 8B is still another flowchart showing a method according to an embodiment of the present disclosure.

DESCRIPTION OF EMBODIMENTS

Figure 1:
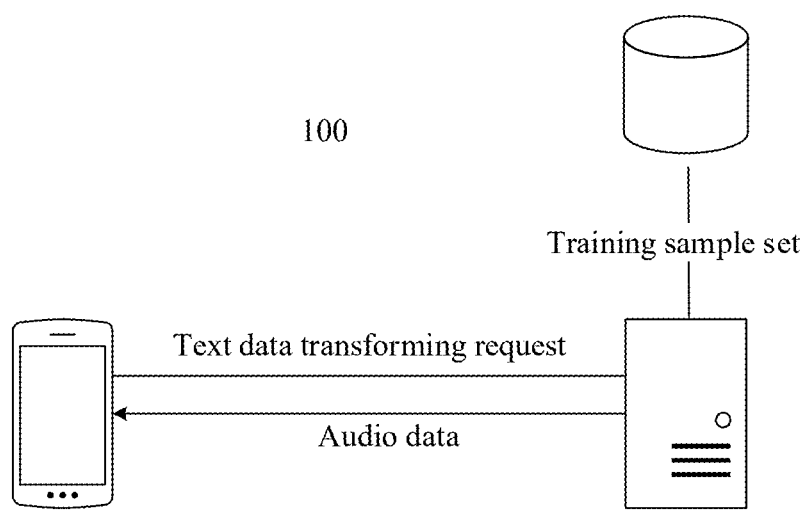
FIG. 1 is an exemplary schematic diagram showing a scenario of reasoning by an acoustic model according to an embodiment of the present disclosure.

To make the objectives, technical solutions, and advantages of the present disclosure more obvious, exemplary embodiments of the present disclosure are described in detail below with reference to the accompanying drawings. The described embodiments are merely some but not all of the embodiments of this disclosure. It should be understood that, this disclosure is not limited by the exemplary embodiments described herein.

In this specification and the accompanying drawings, steps and elements having substantially the same or similar elements are denoted by the same or similar reference numerals, and repeated descriptions of such steps and elements may be omitted. In addition, in the description of the present disclosure, the terms "first", "second" and the like are used merely for distinguishing descriptions, and are not to be construed as indicating or implying relative importance or a sequence.

An attentive mechanism will reduce the convergence speed of a model, so as to make generated sound features not stable enough and the robustness insufficient during generation of sound data of long sentences. An encoder and a decoder of the same architecture will make it possible that an acoustic feature does not accord with a text condition extracted from text data (e.g., it needs to guarantee that no word is missed in synthesized speech), or make a text feature extracted from a long text not accurate enough. An autoregressive neural network model may weaken the dependence between the text condition and the synthesized speech, causing the situations of missing words and sentences.

Therefore, a TTS technology needs to be further improved to synthesize speech that is closer to loud reading of real people more robustly.

For the ease of description of the present disclosure, concepts related to the present disclosure are introduced below.

In the present disclosure, the method for transforming the text data into the acoustic feature may be implemented using an acoustic model. An encoder, a decoder and a length regulator referred to in the following are all components of the acoustic model.

The acoustic model of the present disclosure may be based on artificial intelligence (AI). Artificial intelligence (AI) is a theory, method, technology, and an application system in which a digital computer or a machine controlled by a digital computer is used to simulate, extend, and expand human intelligence, perceive an environment, acquire knowledge, and use the knowledge to obtain an optimal result. In other words, AI is a comprehensive technology in computer science and attempts to understand the essence of intelligence and produce a new intelligent machine that can react in a manner similar to human intelligence. For example, as for the acoustic model of the present disclosure, it can translate expressions of languages in a way of reading and understanding the expressions of different languages like the human beings. Through studying design principles and implementation methods of various intelligent machines, the artificial intelligence enables the acoustic model of the present disclosure to have a function of understanding the expressions of a plurality of different languages and translating them into expressions of other languages.

The artificial intelligence technology relates to a wide range of fields including both hardware-level technologies and software-level technologies. Artificial intelligence software technologies mainly include several major directions such as a computer vision technology, a natural language processing technology, and machine learning/deep learning.

In some embodiments, a natural language processing (NLP) technology is adopted by the acoustic model of the present disclosure. The NLP technology is one of important directions in the field of computer science and the field of artificial intelligence, which can implement various theories and methods for effective communication between human and computers with natural languages. Natural language processing is a science that integrates linguistics, computer science and mathematics. Thus, based on the NLP technology, the acoustic model of the present disclosure can analyze inputted text data and extract features in the text data, and then generate audio data in a manner of reading texts aloud by human beings.

In some embodiments, the NLP technology adopted in the embodiment of the present disclosure may also be based on machine learning (ML) and deep learning. Machine learning is a multi-field interdiscipline and relates to a plurality of disciplines such as the probability theory, statistics, the approximation theory, convex analysis, and the algorithm complexity theory. Natural language processing technology uses machine learning to study how a computer simulates or implements a human language learning behavior, analyzes existing and classified text data to obtain new knowledge or skills, and reorganize an existing knowledge structure, so as to keep improving the performance of the computer. Machine learning and deep learning usually include technologies such as artificial neural network, belief network, reinforcement learning, transfer learning, and inductive learning.

In some embodiments, the acoustic model capable of being used for the embodiment of the present disclosure in the following may be an artificial intelligence model, especially a neural network model based on artificial intelligence. Generally, the neural network model based on artificial intelligence is implemented as an acyclic graph, with neurons arranged in different layers. Generally, the neural network model includes an input layer and an output layer, and the input layer and the output layer are separated by at least one hidden layer. The hidden layer transforms an input received by the input layer into a representation useful for generating an output in the output layer. Network nodes are fully connected to nodes in adjacent layers via sides, and there is no side among the nodes in each layer. Data received at the nodes of the input layer of the neural network is propagated to the nodes of the output layer via any one of the hidden layer, an activation layer, a pooling layer, a convolutional layer and the like. The input and output of the neural network model may adopt various forms, which is not limited in the present disclosure.

The solutions provided in the embodiments of this disclosure relate to technologies such as artificial intelligence, natural language processing, and machine learning, which are specifically described by using the following embodiments.

The acoustic model in the embodiment of the present disclosure may be specifically integrated in an electronic device, and the electronic device may be a device such as a terminal or a server. For example, the acoustic model may be integrated in the terminal. The terminal may include a mobile phone, a tablet computer, a notebook computer, a desktop computer, a personal computer (PC), a smart speaker, a smart watch, or the like, but is not limited thereto. In another example, the acoustic model may be integrated in the server. The server may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The terminal and the server may be directly or indirectly connected in a wired or wireless communication manner. This is not limited in this disclosure.

It can be understood that an apparatus applying the acoustic model in the embodiment of the present disclosure for reasoning may be a terminal, a server or a system composed of the terminal and the server.

It can be understood that the method for transforming the text data into the acoustic feature of the acoustic model in the embodiment of the present disclosure may be executed on a terminal, on a server or jointly on the terminal and the server.

The acoustic model provided in the embodiments of this disclosure may further relate to an AI cloud service in the field of cloud technologies. The cloud technology refers to a hosting technology that unifies a series of resources such as hardware, software, and networks in a wide area network or a local area network to implement computing, storage, processing, and sharing of data. The cloud technology is a collective name of a network technology, an information technology, an integration technology, a management platform technology, an application technology, and the like based on an application of a cloud computing business mode, and may form a resource pool, which is used as required, and is flexible and convenient. A cloud computing technology becomes an important support. A background service of a technical network system requires a large amount of computing and storage resources, such as a video website, an image website, and more portal websites. As the Internet industry is highly developed and applied, each article may have an identifier in the future and needs to be transmitted to a background system for logical processing. Data at different levels is separately processed, and data in various industries requires strong system support, which can only be implemented by using cloud computing.

The artificial intelligence cloud service is generally referred to as AI as a Service (AIaaS, "AI 即服务" in Chinese). This is a mainstream artificial intelligence platform service mode at present. Specifically, an AIaaS platform will split several common AI services and provide independent or packaged services at the cloud end. This service mode is similar to an AI themed store: all developers can access one or more artificial intelligence services provided by the platform for use through an application programming interface (API), and some senior developers can also use an AI framework and AI infrastructures provided by the platform to deploy, operate and maintain their own exclusive cloud artificial intelligence services.

FIG. 1 is an exemplary schematic diagram showing a scenario 100 of reasoning by an acoustic model according to an embodiment of the present disclosure.

At present, there have been a plurality of loud reading applications. A user may install a loud reading application on a user terminal of the user and instruct text data needing to be transformed into audio data to the loud reading application. Next, the user terminal may transmit a text data transforming request to a server of the application through a network, then receive transformed audio data corresponding to the text data and play the audio data.

After receiving the text data to be transformed, the server transforms the text data by utilizing an acoustic model to obtain the audio data and then feeds the audio data back to the user (for example, the audio data corresponding to the text data in FIG. 1).

The user may score the audio data. For example, if the user thinks that the audio data and the text data are well corresponded, there is no obvious word and sentence missing and the effect is close to a loud reading effect of real people, the user may give a high score to the audio data, and the server may take this text data-audio data pair as a positive sample for training the acoustic model in real time. If the user gives a low score to the audio data, the server may take this text data-audio data pair as a negative sample for training the acoustic model in real time.

Of course, the server may further use other manners to obtain samples for training the acoustic model. For example, the server may grasp audios of texts read aloud by real people and the corresponding texts existing in the current Internet environment, and then use such texts read aloud by real people to train the acoustic model. For example, referring to FIG. 1, the server may obtain a text from a database and then use the text for training the acoustic model.

At present, the acoustic model for transforming the text data into the audio data may be an autoregressive neural network model based on an attentive mechanism (e.g., Tacotron) or a non-autoregressive feedforward neural network model based on a duration predictor (e.g., Fastspeech).

Tacotron is an example of the autoregressive neural network model based on the attentive mechanism. Y Wang, R. Skerry-Ryan, D. Stanton, Y Wu, R. J. Weiss, N. Jaitly, Z. Yang, Y. Xiao, Z. Chen, S. Bengio and other researchers had introduced Tacotron in detail in the article "Tacotron: Towards end-to-end speech synthesis". In the article, it is proposed that Tacotron combines generation of language features and acoustic features into one network, and end-to-end training is performed with mass data, which simplifies a traditional synthesis process and generates highly natural speech close to the quality of humans' speech.

However, Tacotron can only generate human-like speech for an intra-field text (a text same as the training text in type/field), and cannot process an extra-field text (a text different from the training text in type/field) robustly. For example, Tacotron cannot well process a testing text different from the training text in text length. For another example, if the training text is mainly in the field of news while the testing text is mainly in the field of daily conversations, speech of the testing text synthesized by Tacotron is not natural enough. The reasons of weak robustness of Tacotron may be roughly divided into the following categories. First, Tacotron has no soft attentive mechanism to prevent skipping, repeating and wrong pronunciation. Second, Tacotron determines whether speech synthesis is completed by predicting whether a current frame is a stop frame. Therefore, if Tacotron wrongly predicts the stop frame, advanced interception and late stopping will be caused. Third, Tacotron adopts a supervision-based training mechanism, which will cause mismatching between a training period and a reasoning period (which is also referred to as: exposure bias). In addition, Tacotron adopts an autoregressive decoder, while local information preference of the autoregressive decoder may weaken the dependence between a predicted acoustic feature and a text condition, leading to failure of speech synthesis.

Fastspeech is an example of the non-autoregressive feedforward neural network model based on the duration predictor. Y Ren, Y Ruan, X. Tan, T. Qin, S. Zhao, Z. Zhao and T.-Y Liu and other researchers had proposed in the article "Fastspeech: Fast, robust and controllable text to speech" that an attention module is replaced with a duration predictor, which eliminates the robustness problem caused by attention failure and stop frame prediction. However, the quality of synthesized speech of Fastspeech still has a gap compared with Tacotron.

In addition, an encoder and a decoder of Tacotron are the same in type, and both are based on a transformer mechanism. An encoder and a decoder of Fastspeech are also both based on the transformer mechanism. The encoder and the decoder of the same architecture will make it possible that an acoustic feature does not accord with a text condition extracted from text data, or make a text feature extracted from a long text not accurate enough.

Based on this, the present disclosure provides a method for transforming text data into an acoustic feature, which includes: the text data includes a plurality of text data blocks, and the method includes: for each text data block in the plurality of text data blocks, performing coarse fusion processing on a concealed text feature corresponding to the text data block and a concealed text feature corresponding to at least one text data block subsequent to the text data block to obtain at least one coarse fusion text feature; performing fine fusion processing on the at least one coarse fusion text feature to obtain a fine fusion text feature corresponding to the text data block; regulating a length corresponding to the fine fusion text feature; and transforming the fine fusion text feature with the regulated length into the acoustic feature. According to the method, the coarse fusion processing and the fine fusion processing are performed on the concealed text features to learn a fusion process of text features corresponding to the text data, so that the accuracy and richness of the extracted acoustic feature are improved, and natural synthesized speech can be generated robustly.

In the embodiment of the present disclosure, a length regulator is further utilized to replace an attention layer between an encoder and a decoder to overcome the influence of instability caused by the attention layer, so that the natural synthesized speech can be generated robustly. In the embodiment of the present disclosure, a decoder of a non-autoregressive single-layer RNN structure is further utilized to reduce the adverse influence caused by exposure bias and local information preference, so that the decoding efficiency of the decoder and the accuracy of the decoded acoustic feature are improved.

The method according to the embodiment of the present disclosure is introduced in detail below in combination with FIG. 2 to FIG. 14 to improve the accuracy and richness of the extracted acoustic feature, so as to make an acoustic model generate natural synthesized speech robustly.

FIG. 2 is a flowchart showing a method 200 for transforming text data into an acoustic feature according to an embodiment of the present disclosure. The method 200 according to the embodiment of the present disclosure may be applied to any electronic device. It can be understood that the electronic device may be different types of hardware devices, such as a personal digital assistant (PDA), an audio/video device, a mobile phone, an MP3 player, a personal computer, a laptop computer, a server and the like. For example, the electronic device may be the server, the user terminal or the system composed of the server and the user terminal in FIG. 1 or the like. It is to be understood by those skilled in the art that the present disclosure is not limited to this.

Referring to FIG. 2, in step S201, for each text data block in a plurality of successive text data blocks constituting text data, a concealed text feature corresponding to the text data block and a concealed text feature corresponding to at least one text data block subsequent to the text data block are obtained through a neural network model; the concealed text feature being a feature vector generated in the neural network model and not a final output; coarse fusion processing is performed on the concealed text feature corresponding to the text data block and the concealed text feature corresponding to the at least one text data block subsequent to the text data block to obtain at least one coarse fusion text feature; and fine fusion processing is performed on the at least one coarse fusion text feature to obtain a fine fusion text feature corresponding to the text data block.

In an example, (i) a concealed text feature corresponding to a text data block of a plurality of text data blocks included in the text data and (ii) at least one concealed text feature corresponding to at least one text data block subsequent to the text data block are generated. The concealed text feature corresponding to the text data block is a feature vector that is an output of an intermediate layer of a neural network of the acoustic apparatus and indicates a text feature of the text data block. A coarse fusion is performed on (i) the concealed text feature corresponding to the text data block and (ii) the at least one concealed text feature corresponding to the at least one text data block subsequent to the text data block to obtain at least one coarse fusion text feature, where the coarse fusion is performed based on a linear processing. A fine fusion is performed on the at least one coarse fusion text feature to obtain a fine fusion text feature corresponding to the text data block, where the fine fusion is performed based on at least one trainable hidden layer of the neural network of the acoustic apparatus.

In step S202, a length corresponding to the fine fusion text feature is regulated.

In step S202, a length corresponding to the fine fusion text feature is regulated. In an example, In step S203, the fine fusion text feature with the regulated length is transformed into the acoustic feature.

For example, the text data block herein may be any element constituting a text to be read aloud in FIG. 1, such as a word, a sentence, a phrase, a paragraph, a chapter, etc. The present disclosure does not impose any restrictions on the length and language type of the text data block. For example, the text data block may include text information in English, Chinese, Hindi, Russian, Japanese, Korean and the like, such as "你好世界" in Chinese, "Hello World" in English, etc.

In some embodiments, step S201 may be executed by adopting various neural network models capable of extracting text features from the text data. In some embodiments, the neural network models are implemented as acyclic graphs, with neurons arranged in different layers. The neural network models each includes an input layer and an output layer, and the input layer and the output layer are separated by at least one hidden layer. The hidden layer transforms an input received by the input layer into a representation useful for generating an output in the output layer. Network nodes are fully connected to nodes in adjacent layers via sides, and there is no side among the nodes in each layer. Data received at the nodes of the input layer of the neural network is propagated to the nodes of the output layer via any one of a plurality of hidden layers, a plurality of activation layers, a plurality of pooling layers, a plurality of convolutional layers and the like. The input and output of the neural network model may adopt various forms, which is not limited in the present disclosure.

For example, the concealed text feature corresponding to the text data block (or the concealed text feature corresponding to the at least one text data block subsequent to the text data block) may be any feature vector generated in the process of generating the coarse fusion text feature and the fine fusion text feature and is not a final output. For example, the concealed text feature may be an output of a certain hidden layer, a certain convolutional layer, a certain activation layer or a certain pooling layer in the neural network model executing step S201.

For example, perform the coarse fusion processing on the concealed text feature corresponding to the text data block (and/or the concealed text feature corresponding to the at least one text data block subsequent to the text data block) indicates that only simple linear processing is performed on the concealed text feature, and the concealed text feature does not pass any learnable/trainable hidden layer. Perform the fine fusion processing on the at least one coarse fusion text feature indicates that the at least one coarse fusion text feature passes at least one learnable/trainable hidden layer. The coarse fusion processing may retain information in a certain concealed text feature to a large extent, while the fine fusion processing may perform learnable processing on a plurality of coarse fusion text features to extract more hierarchical and richer information.

In general, a length of the acoustic feature is larger than that of a text feature, so that the length of the text feature needs to be increased to make the text feature be better decoded into the acoustic feature. Of course, in some cases, the length of the text feature may also be reduced to increase the computing speed. Therefore, in step S202, the method 200 regulates the length corresponding to the fine fusion text feature to make the fine fusion text feature be decoded by a decoder more easily.

Various information is fused in the acoustic feature which is obtained by transformation in step S203, such as rhythm information, phoneme information, tone information, word segmenting information, emotion information, text information, semantic information, etc. For example, the acoustic feature is a feature vector that may be directly decoded by a vocoder. For example, the acoustic feature may be a Mel Frequency Cepstral Coefficient (MFCC) of speech to be synthesized etc.

Since the fine fusion text feature performs multi-layer and multi-length deep fusion on a plurality of text features (e.g., the concealed text feature and the coarse fusion feature), the acoustic feature generated based on the fine fusion text feature is high in accuracy and richness, and thus speech closer to human voice can be synthesized.

Therefore, the embodiment of the present disclosure provides the method for transforming the text data into the acoustic feature, and the method performs the coarse fusion processing and the fine fusion processing on the concealed text features corresponding to different text data blocks, so as to improve the accuracy and richness of the transformed acoustic feature. Based on this, the embodiment of the present disclosure can generate the natural synthesized speech robustly.

Figure 3:
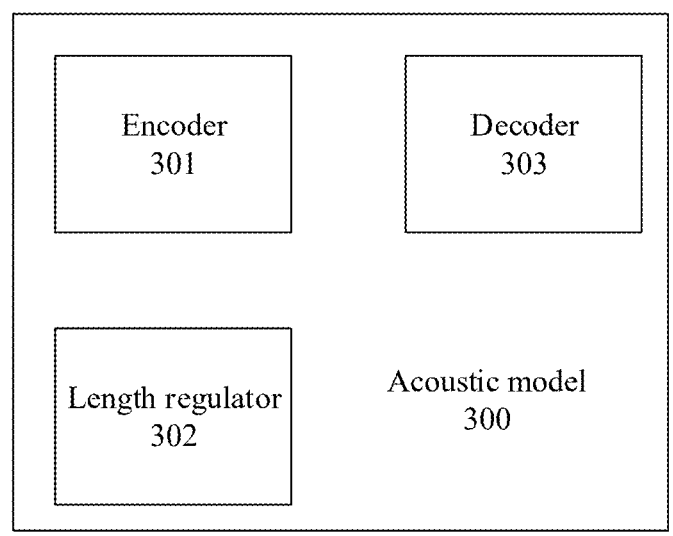
FIG. 3 is a schematic diagram showing an apparatus for transforming text data into an acoustic feature according to an embodiment of the present disclosure.

FIG. 3 is a schematic diagram showing an apparatus (or acoustic apparatus) 300 for transforming text data into an acoustic feature according to an embodiment of the present disclosure. In the following, the apparatus 300 is also called an acoustic model 300. The structure of a neural network model capable of being used for executing the method 200 is described below with the acoustic model shown in FIG. 3 as an example, and it is to be understood by those skilled in the art that the present disclosure is not limited to this. As shown in FIG. 3, the acoustic model includes an encoder 301, a length regulator 302 and a decoder 303.

For example, the encoder 301 may be configured to execute step S201. That is, the encoder 301 is configured to: for each text data block in a plurality of successive text data blocks, perform coarse fusion processing on a concealed text feature corresponding to the text data block and a concealed text feature corresponding to at least one text data block subsequent to the text data block to obtain at least one coarse fusion text feature; and perform fine fusion processing on the at least one coarse fusion text feature to obtain a fine fusion text feature corresponding to the text data block.

Further, the encoder 301 may be a dense-fuse encoder based on a transformer structure. In some embodiments, the encoder 301 may densely connect a plurality of basic transformers through bypass connection, and outputs of the transformers having different information are fused in a non-learnable mode (e.g., coarse fusion processing). The encoder 301 may further include a multi-head attention layer, which further densely connects a plurality of basic transformers, and outputs of hidden layers having different information are fused in a learnable mode (e.g., fine fusion processing). Therefore, richer and more precise information is fused in the fine fusion text feature.

The dense-fuse encoder based on the transformer structure can obtain more global information and is fast in training and high in efficiency, and can achieve rapid concurrency by utilizing a self-attention mechanism (e.g., the multi-head attention layer). In some embodiments, each transformer in the encoder 301 may output the concealed text feature corresponding to a certain text data block.

In some embodiments, the concealed text feature corresponding to the certain text data block is fused with first prediction information and second prediction information of the text data block, the first prediction information is predicted based on the text data block, and the second prediction information is predicted based on at least one text data block subsequent to the text data block.

For example, the first prediction information may be pinyin information, phoneme information, semantic information, emotion information and the like extracted directly based on the text data block. The second prediction information may be emotion information, speech rate information and the like extracted based on the subsequent text data block. It is assumed that a text to be read aloud is "the weather is so nice today". When a concealed text feature corresponding to the word "today" is generated, the influence that may be produced by subsequent words "the weather" and "so nice" on the word needs to be considered. For example, "the weather is so nice" expresses a happy emotion, so speech synthesized based on the concealed text feature corresponding to "today" is to be relaxed and natural instead of being serious. Of course, it is to be understood by those skilled in the art that more or less information may also be fused in the concealed text feature corresponding to the text data block, and the present disclosure is not limited to this.

In some embodiments, the coarse fusion processing is executed by the encoder, and the encoder includes N transformers and N adders. The performing coarse fusion processing on a concealed text feature corresponding to the text data block and a concealed text feature corresponding to at least one text data block subsequent to the text data block may further include: generate N coarse fusion text features based on the concealed text feature corresponding to the text data block and the concealed text feature corresponding to the at least one text data block subsequent to the text data block by utilizing the N transformers and the N adders, N being a positive integer. The coarse fusion processing process will be further described below with reference to FIG. 4, which is not repeated here in the present disclosure. Of course, it is to be understood by those skilled in the art that the coarse fusion processing may further include more or less processing manners, and the present disclosure is not limited to this.

In some embodiments, the performing fine fusion processing on the at least one coarse fusion text feature may further include: predict the fine fusion text feature corresponding to the text data block based on a query feature, a value feature and a key feature, one or more coarse fusion text features in the at least one coarse fusion text feature being the query feature, and the concealed text feature corresponding to the text data block and the concealed text feature corresponding to the at least one text data block subsequent to the text data block being the value feature and the key feature respectively. The fine fusion processing process will be further described below with reference to FIG. 4, which is not repeated here in the present disclosure. Of course, it is to be understood by those skilled in the art that the fine fusion processing may further include more or less processing manners, and the present disclosure is not limited to this.

For example, the length regulator 302 may be configured to execute step S202 to solve the problem of mismatching of lengths between the fine fusion text feature and the acoustic feature to be generated. That is, the length regulator 302 is configured to: regulate a length corresponding to the fine fusion text feature. The length regulator may be used for replacing an attention layer between the encoder 301 and the decoder 303 in the traditional acoustic model to overcome the influence of instability caused by the attention layer, so that the natural synthesized speech can be generated robustly.

For example, the decoder 303 may be configured to execute step S203. That is, the decoder 303 is configured to: transform the fine fusion text feature with the regulated length into the acoustic feature. In some embodiments, the decoder may be of a non-autoregressive single-layer recurrent neural network (RNN) structure. For example, an input of the decoder 303 is the fine fusion text feature with the regulated length, and an output of the decoder is the acoustic feature. Compared with an autoregressive decoder based on a transformer structure in the traditional acoustic model, the decoder of the non-autoregressive single-layer RNN structure is more conductive to generating a text condition and can reduce adverse influence caused by exposure bias and local information preference.

Instead of training the decoder 303 through a strong-supervision mode, only the fine fusion text feature with the regulated length is fed back to the decoder, which imposes extremely high requirements on the fine fusion text feature. The encoder 301 above can meet these requirements.

Therefore, according to the embodiment of the present disclosure, the fusion process of the text features corresponding to the text data is learned by utilizing the dense-fuse encoder capable of densely connecting the plurality of transformers and the multi-head attention layer, so that the accuracy and richness of the extracted acoustic feature are improved, and natural synthesized speech can be generated robustly. In the embodiment of the present disclosure, a length regulator is further utilized to replace an attention layer between an encoder and a decoder to overcome the influence of instability caused by the attention layer, so that the natural synthesized speech can be generated robustly. In the embodiment of the present disclosure, a decoder of a non-autoregressive single-layer RNN structure is further utilized to reduce the adverse influence caused by exposure bias and local information preference, so that the decoding efficiency of the decoder and the accuracy of the decoded acoustic feature are improved.

Figure 4:
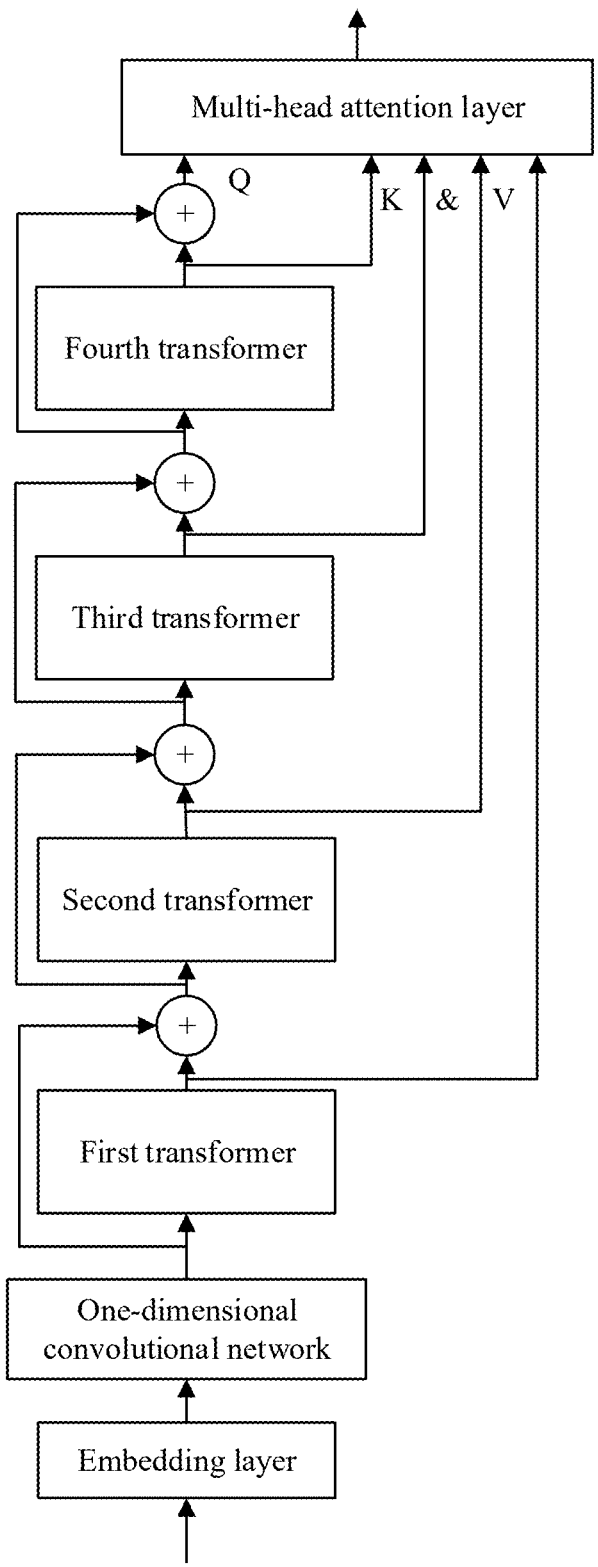
FIG. 4 is a schematic diagram showing an encoder according to an embodiment of the present disclosure.
Figure 5:
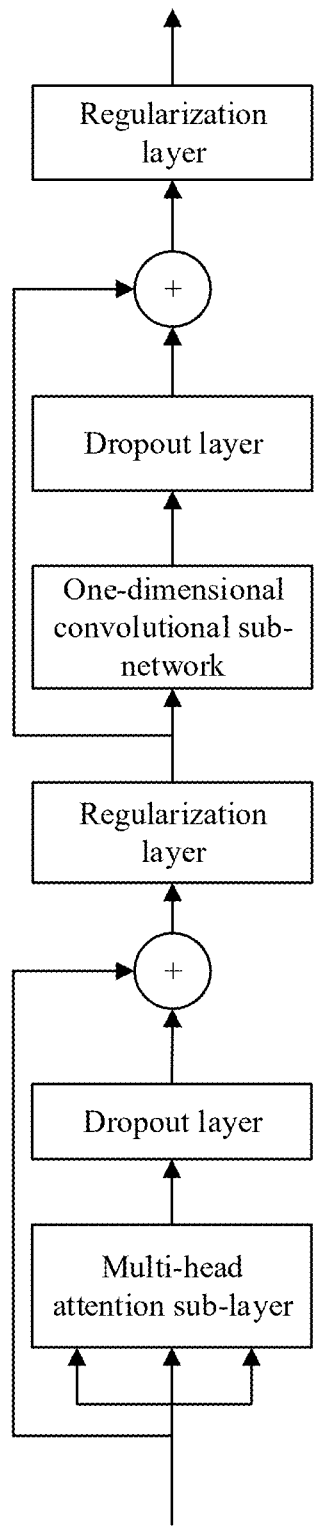
FIG. 5 is a schematic diagram showing a transformer in an encoder according to an embodiment of the present disclosure.

FIG. 4 is a schematic diagram showing the encoder 301 according to an embodiment of the present disclosure. The encoder 301 includes a plurality of transformers. FIG. 5 is a schematic diagram showing the transformer in the encoder 301 according to an embodiment of the present disclosure. It is to be understood by those skilled in the art that the structures shown in FIG. 4 and FIG. 5 are only examples, and the present disclosure is not limited to this.

Referring to FIG. 4, in some embodiments, the encoder 301 may include N transformers, N adders and one multi-head attention layer. An output of an $n^{th}$ transformer and an output of an $(n-1)^{th}$ adder are both connected to an input of an $n^{th}$ adder, an output of the $n^{th}$ adder is connected to an input of an $(n+1)^{th}$ transformer, and an input of the multi-head attention layer includes outputs of the N transformers and an output of the $N^{th}$ adder. Each transformer outputs one concealed text feature, each adder outputs one coarse fusion text feature, and the multi-head attention layer of the transformers outputs the fine fusion text feature corresponding to the text data block, where n is greater than or equal to 1 but less than or equal to N, and N is a positive integer greater than 1. In some embodiments, the encoder may further include an embedding layer and a one-dimensional convolutional network, an example of which may also be as shown in FIG. 4.

For an $m^{th}$ text data block, the operation related to the coarse fusion processing in step S201 (i.e., perform coarse fusion processing on the concealed text feature corresponding to the text data block and the concealed text feature corresponding to the at least one text data block subsequent to the text data block to obtain a coarse fusion text feature) may be executed in the following way.

N-1 concealed text features and N-1 coarse fusion text features are generated by utilizing the $N^{th}$ transformer to the second transformer and the $N^{th}$ adder to the second adder.

For example, for an $N^{th}$ transformer and an $n^{th}$ adder (n is greater than or equal to 2 but less than or equal to N), a concealed text feature corresponding to an $(m+N-n)^{h}$ text data block is generated at first based on an $(n-1)^{h}$ coarse fusion text feature by utilizing the n'h transformer. An $n^{th}$ coarse fusion text feature is generated based on the concealed text feature corresponding to the $(m+N-n)^{th}$ text data block and the $(n-1)^{th}$ coarse fusion text feature by utilizing the $n^{th}$ adder. For example, the $n^{th}$ coarse fusion text feature is the sum of the concealed text feature corresponding to the $(m+N-n)^{th}$ text data block and the $(n-1)^{th}$ coarse fusion text feature. An embedded representation vector corresponding to an $(m+N)^{th}$ text data block is generated based on the $(m+N)^{th}$ text data block by utilizing the embedding layer. A context feature vector containing a relative position feature of the $(m+N)^{th}$ text data block is generated based on the embedded representation vector corresponding to the $(m+N)^{th}$ text data block by utilizing the one-dimensional convolutional network. A concealed text feature corresponding to the $(m+N)^{th}$ text data block is generated based on the context feature vector by utilizing the first transformer. The first coarse fusion text feature is generated based on the $(m+N)^{th}$ context feature vector and a concealed text feature corresponding to an $(m+N-1)^{th}$ text data block by utilizing the first adder. The first coarse fusion text feature is the sum of the $(m+N)^{th}$ context feature vector and the concealed text feature corresponding to the $(m+N-1)^{th}$ text data block.

For the $m^{th}$ text data block, the operation related to the fine fusion processing in step S201 (i.e., perform fine fusion processing on the at least one coarse fusion text feature to obtain a fine fusion text feature corresponding to the text data block) may be executed in the following way.

For example, by utilizing the multi-head attention layer, a fine fusion text feature corresponding to the $m^{th}$ text data block is generated with an $N^{th}$ coarse fusion text feature outputted by the $N^{th}$ adder as a query feature and with the concealed text feature corresponding to the $m^{th}$ text data block to the concealed text feature corresponding to the $(m+N)^{th}$ text data block as a value feature and a key feature.

FIG. 4 only shows an example that the encoder 301 includes 4 transformers (e.g., show as the fourth transformer, the third transformer, the second transformer and the first transformer), 4 adders (shown as ⊕, referred to as the fourth adder, the third adder, the second adder and the first adder respectively from top to bottom in the following), one multi-head attention layer, one embedding layer and one one-dimensional convolutional network. It is to be understood by those skilled in the art that the present disclosure is not limited to this.

Description is made by using the case of N=4 and m=2 shown in FIG. 4. It is assumed that the encoder 301 is to encode a word sequence {a, b, c, d, e, f}. At the moment, the word corresponding to the $m^{th}$ text data block is "b".

The multi-head attention layer generates a fine fusion text feature corresponding to the second text data block with the fourth coarse fusion text feature outputted by the fourth adder as the query feature and with the concealed text feature corresponding to the second text data block to the concealed text feature corresponding to the sixth text data block as the value feature and the key feature. For example, a multi-head attention sub-layer calculates a fine fusion text feature which contains self-attention information of "b", "c", "d" and "e" and densely fuses text information of "b", "c", "d" and "e" based on the query feature (shown as Q) by calculating attention distribution of the value feature (shown as V) and adding the attention distribution to the key feature (shown as K).

The concealed text feature corresponding to the second text data block ("b") is generated based on the third coarse fusion text feature by utilizing the fourth transformer. The concealed text feature corresponding to "b" is fused with first prediction information and second prediction information, the first prediction information is predicted based on the text data block "b", and the second prediction information is predicted based on the text data blocks "c", "d" and "e".

The fourth coarse fusion text feature is generated based on the concealed text feature corresponding to the second text data block ("b") and the third coarse fusion text feature by utilizing the fourth adder. The fourth coarse fusion text feature is the sum of the concealed text feature corresponding to the second text data block and the third coarse fusion text feature.

The concealed text feature corresponding to the third text data block ("c") is generated based on the second coarse fusion text feature by utilizing the third transformer. The concealed text feature corresponding to "c" is fused with first prediction information and second prediction information, the first prediction information is predicted based on the text data block "c", and the second prediction information is predicted based on the text data blocks "d" and "e".

The third coarse fusion text feature is generated based on the concealed text feature corresponding to the third text data block ("c") and the second coarse fusion text feature by utilizing the third adder. The third coarse fusion text feature is the sum of the concealed text feature corresponding to the third text data block and the second coarse fusion text feature.

The concealed text feature corresponding to the fourth text data block ("d") is generated based on the first coarse fusion text feature by utilizing the second transformer. The concealed text feature corresponding to "d" is fused with first prediction information and second prediction information, the first prediction information is predicted based on the text data block "d", and the second prediction information is predicted based on the text data block "e".

The second coarse fusion text feature is generated based on the concealed text feature corresponding to the fourth text data block ("d") and the first coarse fusion text feature by utilizing the second adder. The second coarse fusion text feature is the sum of the concealed text feature corresponding to the fourth text data block and the first coarse fusion text feature.

The concealed text feature corresponding to the fifth text data block ("e") is generated based on a context feature vector corresponding to "e" by utilizing the first transformer. The concealed text feature corresponding to "e" is fused with first prediction information, and the first prediction information is predicted based on the text data block "e".

The first coarse fusion text feature is generated based on the fifth context feature vector and the concealed text feature corresponding to the fourth text data block by utilizing the first adder. The first coarse fusion text feature is the sum of the fifth context feature vector and the concealed text feature corresponding to the fourth text data block ("d").

An embedded representation vector corresponding to the fifth text data block ("e") is generated based on the fifth text data block ("e") by utilizing the embedding layer. Then the context feature vector containing a relative position feature of the fifth text data block ("e") is generated based on the embedded representation vector corresponding to the fifth text data block ("e") by utilizing the one-dimensional convolutional network. The one-dimensional convolutional network can capture relative position information of the text data block ("e") in the entire word sequence through a convolution operation.

The structure of the first transformer to the fourth transformer is as shown in FIG. 5, and how is the concealed text feature corresponding to "e" predicted based on the context feature vector corresponding to the text data block "e" by the transformer is explained below with reference to FIG. 5.

As shown in FIG. 5, each transformer includes one multi-head attention sub-layer, a plurality of dropout layers, a plurality of sub-adders, a plurality of regularization layers, a one-dimensional convolutional sub-network, etc. The dropout layers may randomly make certain neurons in previous hidden layers not work to avoid over-fitting.

The multi-head attention sub-layer in the first transformer performs deep extraction and fusion on the context feature vector corresponding to the text data block "e" with the context feature vector corresponding to the text data block "e" as the query feature, the value feature and the key feature. For example, the multi-head attention sub-layer calculates a sub-feature vector containing self-attention information of "e" based on the query feature by calculating attention distribution of the key feature and adding the attention distribution to the value feature. Then the transformer performs further processing on the sub-feature vector, for example, performs further feature extraction and fusion on the context feature vector corresponding to "e" and the sub-feature vector containing the self-attention information of "e" through the plurality of dropout layers, the plurality of sub-adders, the plurality of regularization layers, the one-dimensional convolutional sub-network and the like to predict the concealed text feature corresponding to "e".

The multi-head attention sub-layer in the first transformer performs deep extraction and fusion on the first coarse fusion text feature with the first coarse fusion text feature as the query feature, the value feature and the key feature to predict the concealed text feature corresponding to "d". Since the first coarse fusion text feature is the sum of the context feature vector of "e" and the concealed text feature, outputted via the first transformer, of the fourth text data block ("d"), the concealed text feature corresponding to "d" predicted by the multi-head attention sub-layer includes information of "e" and information of "d". The deep fusion and extraction process of other transformers can be analogized as such, which will not be repeated here in the present disclosure.

In some embodiments, all the above feature vectors (the concealed text feature, the coarse fusion text feature and the fine fusion text feature) may be 256-dimensional or 1024-dimensional numeric vectors, which can be configured in a customized mode according to the configuration precision of the acoustic model.

From the perspective of feature fusion, the dense connection mode as shown in FIG. 4 may enable a feature outputted by a lower-layer transformer to be reused by an upper-layer transformer. Since features extracted by different transformers have different information, the feature reuse mode as shown in FIG. 4 may enhance the final representation capability of the encoder 301. From the perspective of training, a supervision signal of the upper-layer transformer may be better transmitted back to the lower-layer transformer, playing a role similar to deep supervision (strong supervision), which makes the encoder be trained more easily.

The encoder 301 is directly used for calculating the coarse fusion text feature through the adders and may keep the coarse fusion text feature unchanged in length in an iteration process of the coarse fusion text feature, and two features stacked by the adders are the same in weight, so that the coarse fusion processing process is faster.

The encoder 301 further achieves combined weighted stacking of a plurality of text feature vectors by applying the multi-head attention layer, and through such a learnable mode, information fused in different concealed text feature vectors and coarse fusion text feature vectors is combined to obtain a fine fusion text feature vector rich in information.

Therefore, according to the embodiment of the present disclosure, the fusion process of the text features corresponding to the text data is learned by utilizing the dense-fuse encoder capable of densely connecting the plurality of transformers and the multi-head attention layer, so that the accuracy and richness of the extracted acoustic feature are improved, and natural synthesized speech can be generated robustly.

Figure 6:
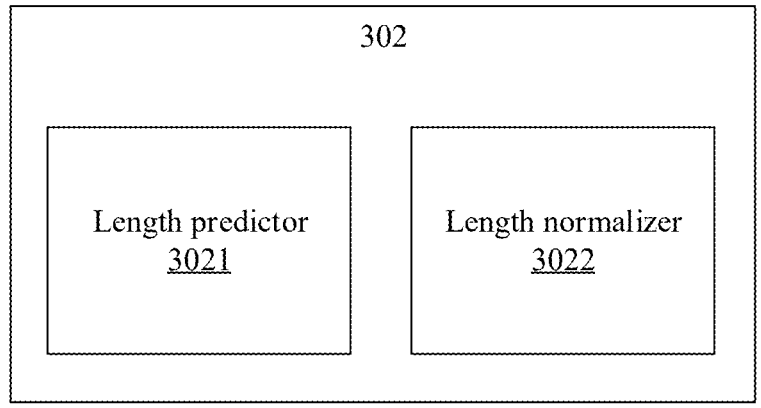
FIG. 6 is a schematic diagram showing a length regulator according to an embodiment of the present disclosure.
Figure 7:
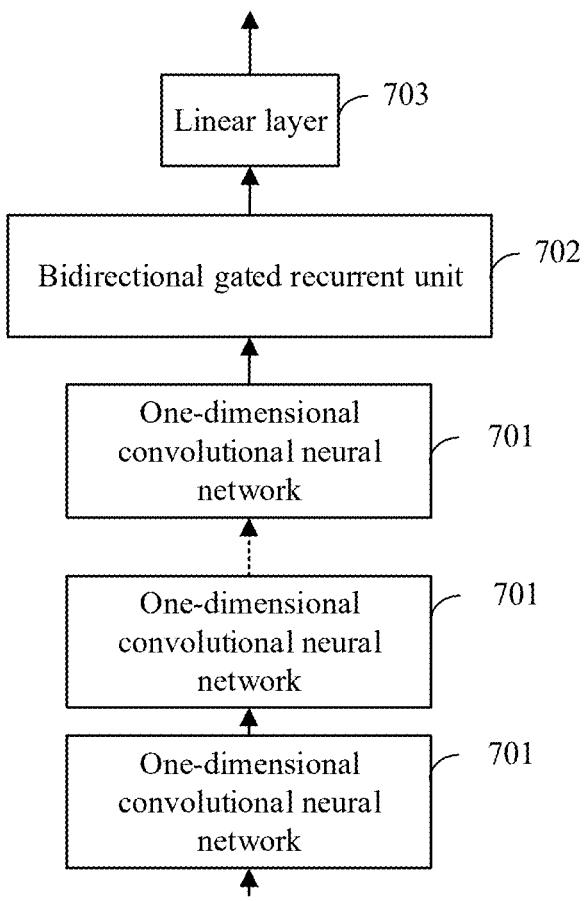
FIG. 7 is a schematic diagram showing a length predictor according to an embodiment of the present disclosure.

FIG. 6 is a schematic diagram showing the length regulator 302 according to an embodiment of the present disclosure. FIG. 7 is a schematic diagram showing a length predictor according to an embodiment of the present disclosure.

As shown in FIG. 6, the length regulator 302 includes a length predictor 3021 and a length normalizer 3022.

Step S202 above further includes: predict a length of the acoustic feature corresponding to the fine fusion text feature by utilizing the length predictor 3021 in the length regulator 302; and regulate the length corresponding to the fine fusion text feature to generate a fine fusion text feature with the regulated length based on the length of the acoustic feature corresponding to the fine fusion text feature and the fine fusion text feature by utilizing the length normalizer 3022 in the length regulator 302.

As shown in FIG. 7, the length predictor 3021 includes a plurality of cascaded one-dimensional convolutional neural networks 701, a bidirectional gated recurrent unit 702 and a linear layer 703. The one-dimensional convolutional neural network 701 is configured to extract a relative position feature in the fine fusion text feature. The bidirectional gated recurrent unit 702 is configured to generate a global context feature based on the relative position feature. The linear layer 703 is configured to generate the length of the acoustic feature corresponding to the fine fusion text feature based on the global context feature.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The number of the plurality of cascaded one-dimensional convolutional neural networks 701 is K, K being greater than zero. The predict a length of the acoustic feature corresponding to the fine fusion text feature by utilizing the length predictor 3021 in the length regulator 302 further includes: extract a first relative position feature in the fine fusion text feature based on the fine fusion text feature by utilizing the first one-dimensional convolutional neural network; generate a Kth relative position feature by utilizing the second one-dimensional convolutional neural network to the Kth one-dimensional convolutional neural network, for a kth length prediction layer, k being greater than or equal to 2 but less than or equal to K, generate a kth relative position feature based on a (k-1)th relative position feature by utilizing the one-dimensional convolutional neural network in the kth length prediction layer; and generate the global context feature based on the Kth relative position feature by utilizing the bidirectional gated recurrent unit 702, and generate the length of the acoustic feature corresponding to the fine fusion text feature based on the global context feature by utilizing the linear layer 703.

FIG. 7 shows an example of the length predictor, and the length predictor includes 3 cascaded one-dimensional convolutional neural networks 701, one bidirectional gated recurrent unit 702 and one linear layer 703. The first one-dimensional convolutional neural network takes the fine fusion text feature as an input and the first relative position feature in the fine fusion text feature as an output. The first relative position feature not only includes the relative position feature in the fine fusion text feature, but also includes other information related to the text data blocks included in the fine fusion text feature. Then, the second one-dimensional convolutional neural network takes the first relative position feature as an input and the second relative position feature as an output, and the third one-dimensional convolutional neural network takes the second relative position feature as an input and the third relative position feature as an output. Then, the bidirectional gated recurrent unit generates the global context feature based on the third relative position feature. Finally, the linear layer generates the length of the acoustic feature corresponding to the fine fusion text feature based on the global context feature.

Therefore, through processing the fine fusion text feature by the one-dimensional convolutional neural networks, the one-dimensional convolutional neural networks can well extract local position-related information in the fine fusion text feature. Considering that the length of the acoustic feature is not only related to the relative position information of the text data block, but also related to global context information, the related information is extracted through the bidirectional gated recurrent unit, and the information is mapped to a scalar through the linear layer.

Therefore, the length regulator 302 may solve the problem of mismatching of lengths between the fine fusion text feature and the acoustic feature to be generated. The length regulator 302 may be used for replacing the attention layer between the encoder and the decoder in the traditional acoustic model to overcome the influence of instability caused by the attention layer, so that the natural synthesized speech can be generated robustly.

Figure 8A:
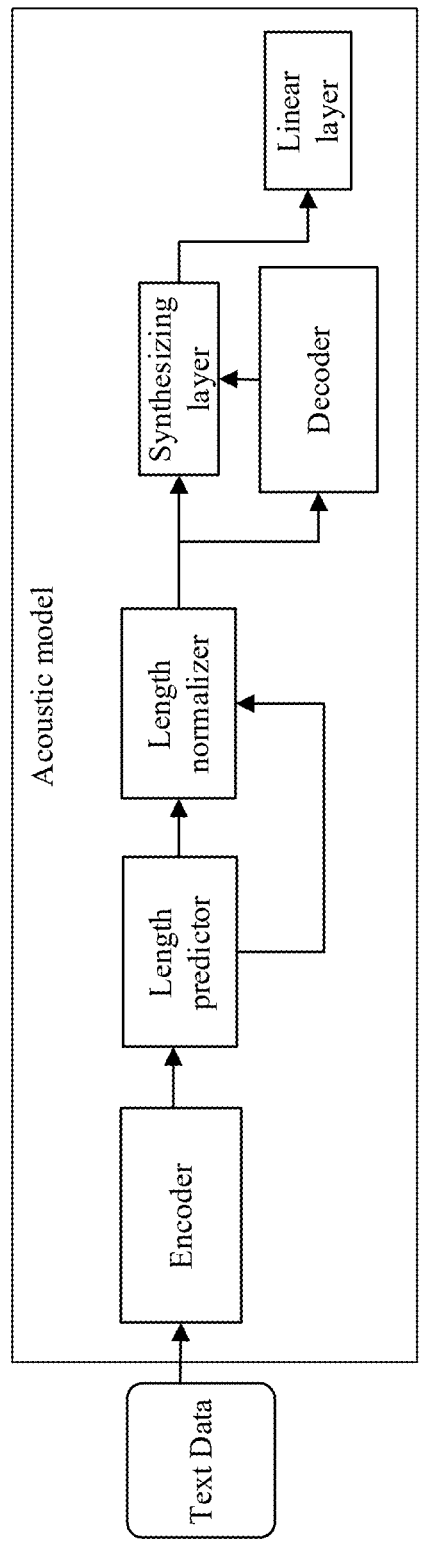
FIG. 8A is another schematic diagram showing an acoustic model according to an embodiment of the present disclosure.
Figure 8C:
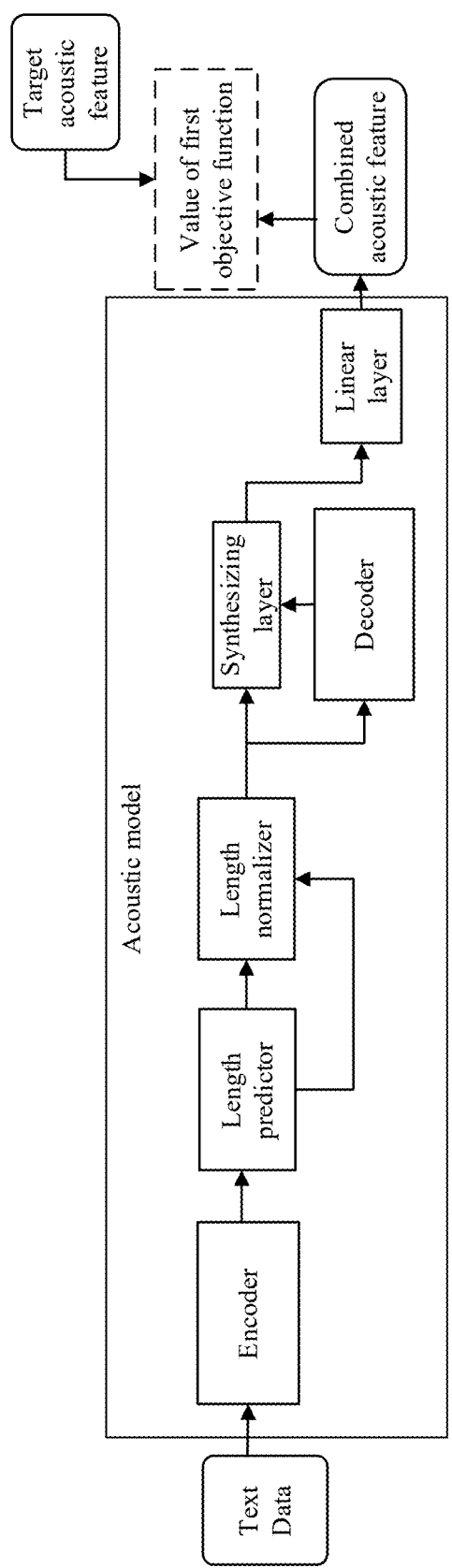
FIG. 8C is a schematic diagram showing a training flow for training the acoustic model in FIG. 8A.

FIG. 8A is another schematic diagram showing an acoustic model according to an embodiment of the present disclosure. FIG. 8B is still another flowchart showing a method according to an embodiment of the present disclosure. FIG. 8C is a schematic diagram showing a training flow for training the acoustic model in FIG. 8A.

As shown in FIG. 8A, the acoustic model 300 may further include a synthesizing layer and a linear layer. In some embodiments, the acoustic model 300 may further include a vocoder. Therefore, referring to FIG. 8B, a method 800 may further include step S204 to step S205. In step S204, a plurality of acoustic features corresponding to the plurality of text data blocks are combined to generate a combined acoustic feature by utilizing the synthesizing layer; and in step S205, linear adjustment is performed on the combined acoustic feature by utilizing the linear layer.

In some embodiments, the linearly-adjusted combined acoustic feature may be directly transformed into audio data for outputting by utilizing the vocoder. In some embodiments, the vocoder may be a light-weight neural network, where an LPC-Net technology may be used. It is to be understood by those skilled in the art that the vocoder may also be other types of vocoders, and the present disclosure is not limited to this.

In some embodiments, the encoder, the length regulator, the decoder, the synthesizing layer and the linear layer are trained based on a plurality of groups of training sample sets, and each training sample in the plurality of groups of training sample sets includes training text data and a target acoustic feature corresponding to the training text data.

In some embodiments, a part of training samples in the plurality of groups of training sample sets may be recorded by a professional Chinese female speaker in a recording studio. Text contents in the training sample sets cover many fields, an average sentence length is 70 characters, and the number of statements for training is 9600. The number of statements used for training is 9600. In some embodiments, the other part of training samples in the plurality of groups of training sample sets may be composed of 12000 audio files extracted from online audio books, and the audio files are recorded by an actor with rich rhythm sensation. Texts may be novels, with an average sentence length of 86 characters. The audios above may be sampled at 16 kHz and subjected to 16-bit quantification. In some embodiments, another part of training samples in the plurality of groups of training sample sets may be selected from recordings of life, such as conversation samples covering the fields of politics, sports, entertainment, literature, cooking and the like. These conversation samples may include a large number of hot vocabulary and long paragraphs.

In some embodiments, training of the encoder, the decoder, the synthesizing layer and the linear layer includes: transform the training text data into the linearly-adjusted combined acoustic feature by utilizing the encoder, the decoder, the synthesizing layer and the linear layer (in some embodiments, further including utilizing the length regulator), calculate a value corresponding to a first objective function based on the linearly-adjusted combined acoustic feature and the target acoustic feature corresponding to the training text data, and adjust parameters of neurons in the encoder, the decoder, the synthesizing layer and the linear layer based on the value corresponding to the first objective function to converge the value corresponding to the first objective function.

In some embodiments, the first objective function indicates: a similarity between the linearly-adjusted combined acoustic feature and the target acoustic feature corresponding to the training text data. That is, training of the acoustic model is a process of maximizing the similarity between the linearly-adjusted combined acoustic feature and the target acoustic feature corresponding to the training text data. The first objective function is also called a first loss function.

Therefore, training of the acoustic model can be completed through the above training process. When any text passes the encoder, the length regulator, the decoder, the synthesizing layer, the linear layer and the first vocoder, speech with high naturalness can be obtained.

Figure 9A:
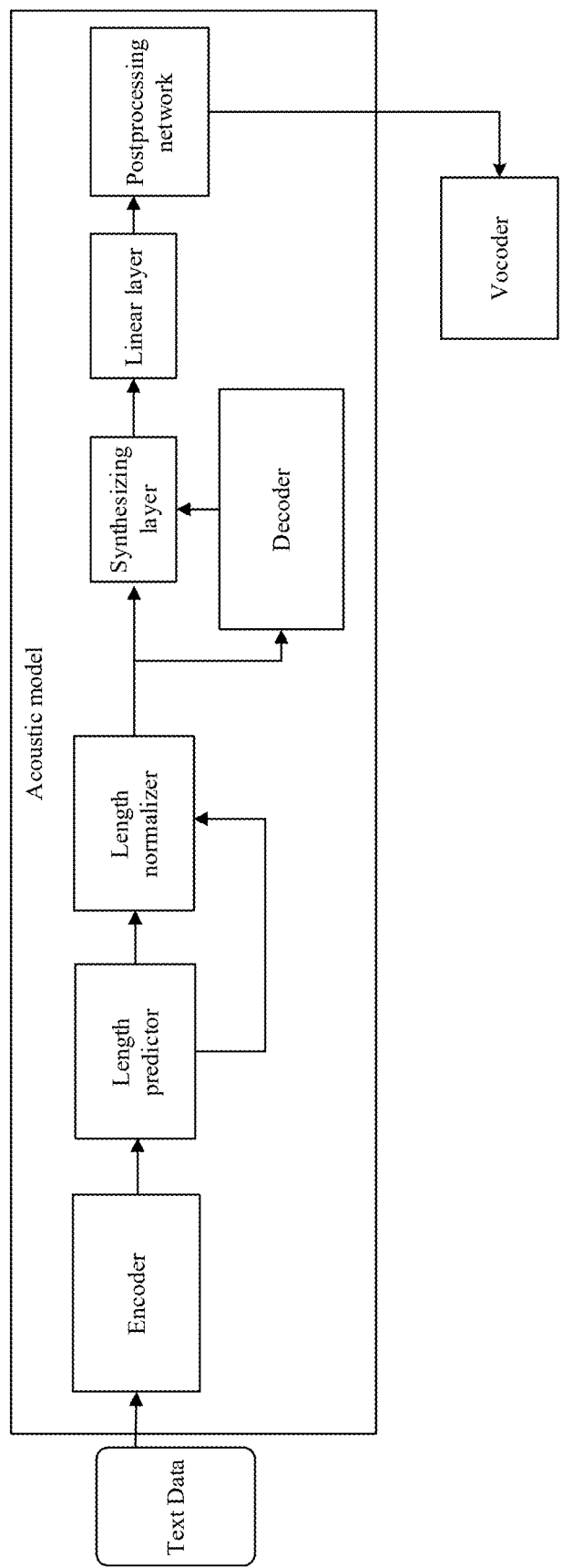
FIG. 9A is yet another schematic diagram showing an acoustic model according to an embodiment of the present disclosure.
Figure 9B:
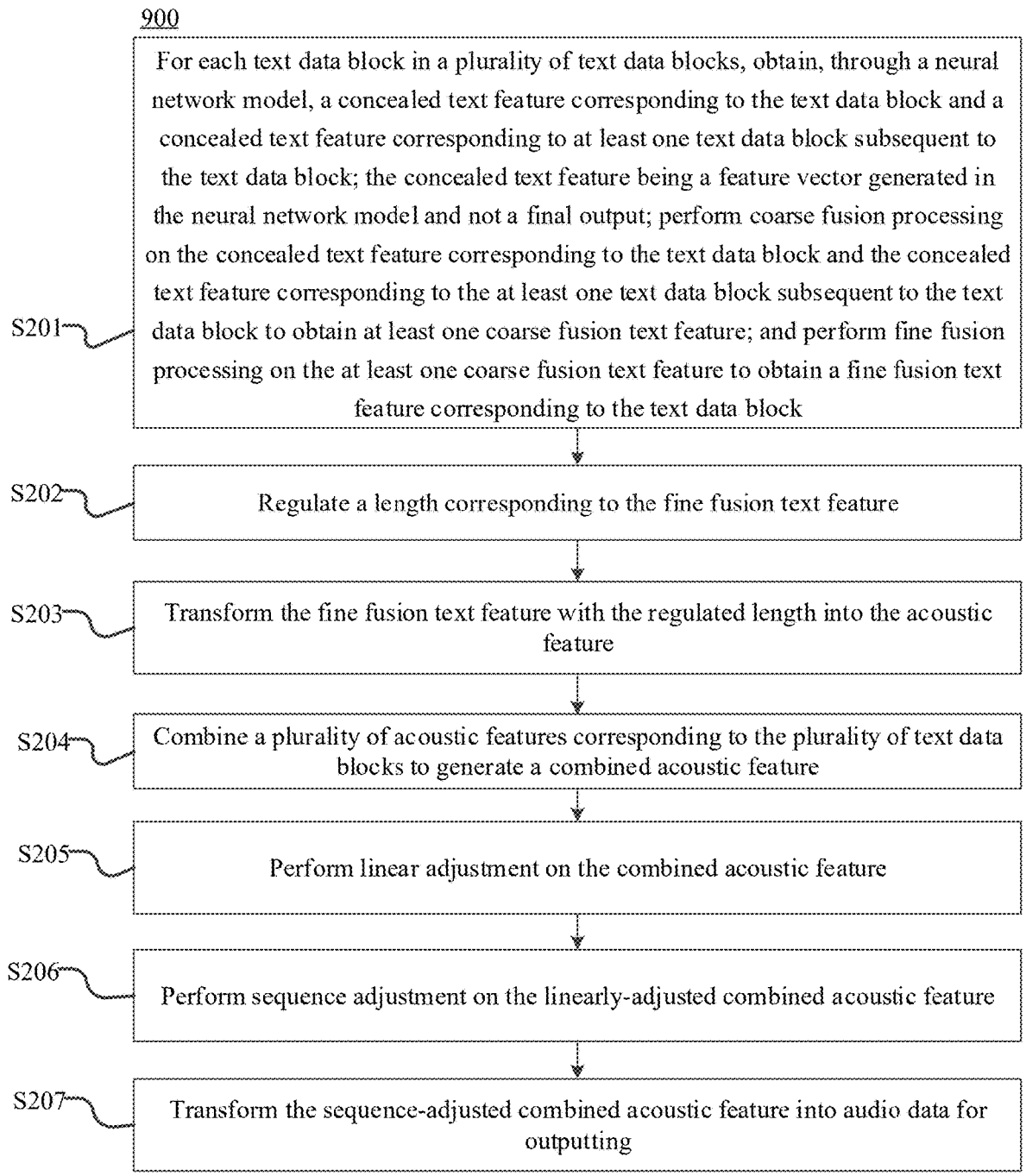
FIG. 9B is still another flowchart showing a method according to an embodiment of the present disclosure.
Figure 9C:
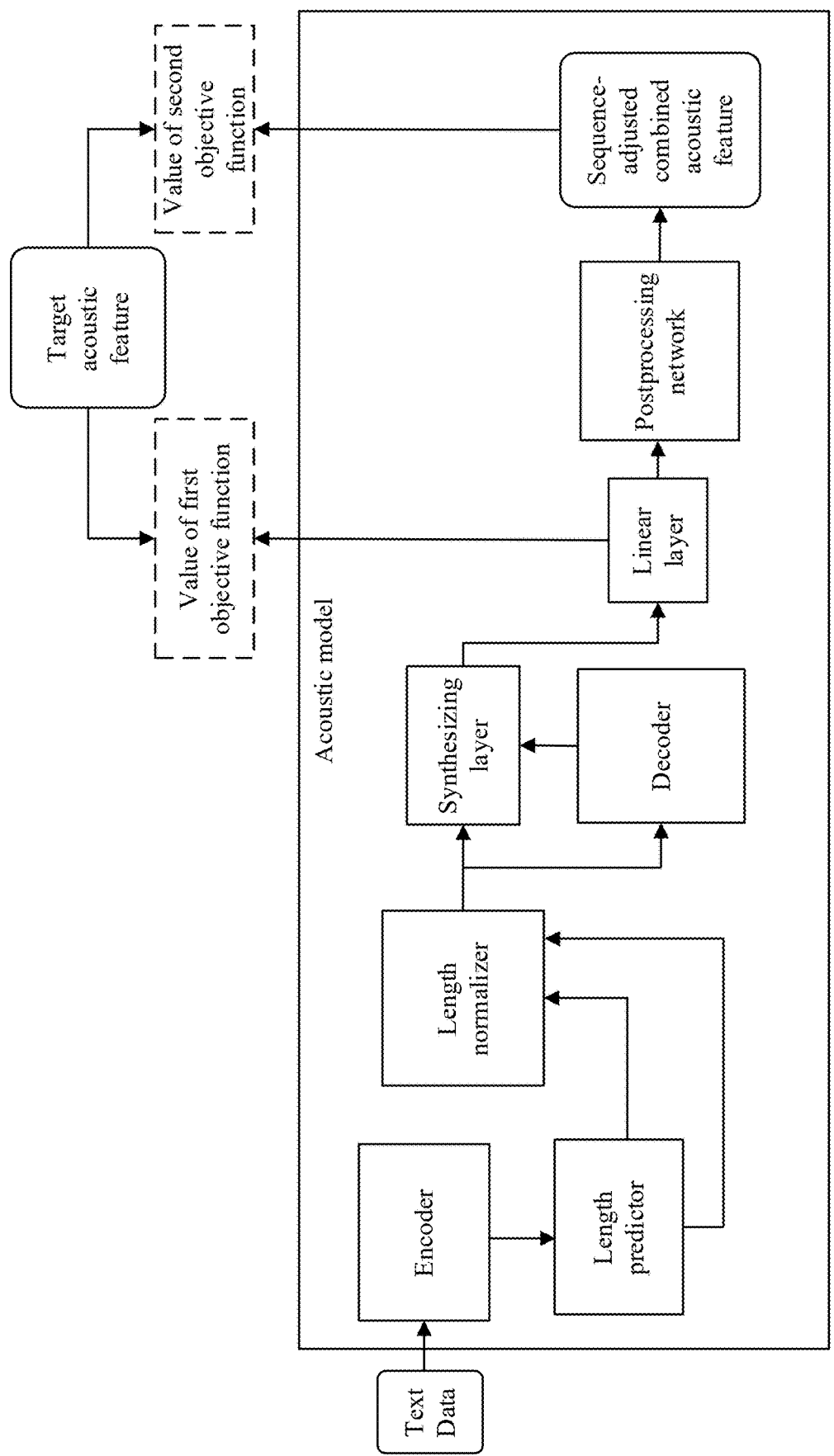
FIG. 9C is a schematic diagram showing a training flow for training the acoustic model in FIG. 9A.

FIG. 9A is yet another schematic diagram showing an acoustic model according to an embodiment of the present disclosure. FIG. 9B is still another flowchart showing a method according to an embodiment of the present disclosure. FIG. 9C is a schematic diagram showing a training flow for training the acoustic model in FIG. 9A.

As shown in FIG. 9A, the acoustic model 300 may further include a postprocessing network. In some embodiments, the acoustic model 300 may further include a second vocoder. Therefore, as shown in FIG. 9B, a method 900 may further include step S204 to step S207. In step S204, a plurality of acoustic features corresponding to the plurality of text data blocks are combined to generate a combined acoustic feature by utilizing the synthesizing layer; in step S205, linear adjustment is performed on the combined acoustic feature by utilizing the linear layer; and in step S206, sequence adjustment is performed on the linearly-adjusted combined acoustic feature by utilizing the postprocessing network, and in step S207, the sequence-adjusted combined acoustic feature is transformed into audio data for outputting by utilizing the vocoder.

In some embodiments, the encoder, the length regulator, the decoder, the synthesizing layer, the linear layer and the postprocessing network are trained based on a plurality of groups of training sample sets, and each training sample in the plurality of groups of training sample sets includes training text data and a target acoustic feature corresponding to the training text data. The plurality of groups of training sample sets may be the same as the embodiment described in FIG. 8A to FIG. 8C, and it is to be understood by those skilled in the art that the present disclosure is not limited to this.

In some embodiments, training of the encoder, the decoder, the synthesizing layer, the linear layer and the postprocessing network may include: transform the training text data into the sequence-adjusted combined acoustic feature by utilizing the encoder, the decoder, the synthesizing layer, the linear layer and the postprocessing network (in some embodiments, further including utilizing the length regulator), calculate a value corresponding to a second objective function based on the sequence-adjusted combined acoustic feature and the target acoustic feature corresponding to the training text data, and adjust parameters of neurons in the encoder, the decoder, the synthesizing layer, the linear layer and the postprocessing network based on the value corresponding to the second objective function to converge the value corresponding to the second objective function.

In some embodiments, the second objective function indicates: a similarity between the sequence-adjusted combined acoustic feature and the target acoustic feature corresponding to the training text data. That is, training of the acoustic model is a process of maximizing the similarity between the sequence-adjusted combined acoustic feature and the target acoustic feature corresponding to the training text data. The second objective function is also called a second loss function.

In some embodiments, training of the encoder, the length regulator, the decoder, the synthesizing layer, the linear layer and the postprocessing network may further include: calculate a weighted sum of the value corresponding to the first objective function and the value corresponding to the second objective function, and adjust the parameters of the neurons in the encoder, the length regulator, the decoder, the synthesizing layer, the linear layer and the postprocessing network to converge a value corresponding to the weighted sum.

Therefore, training of the acoustic model can be completed through the above training process. When any text passes the encoder, the length regulator, the decoder, the synthesizing layer, the linear layer, the postprocessing network and the vocoder, speech with high naturalness can be obtained.

Figure 10:
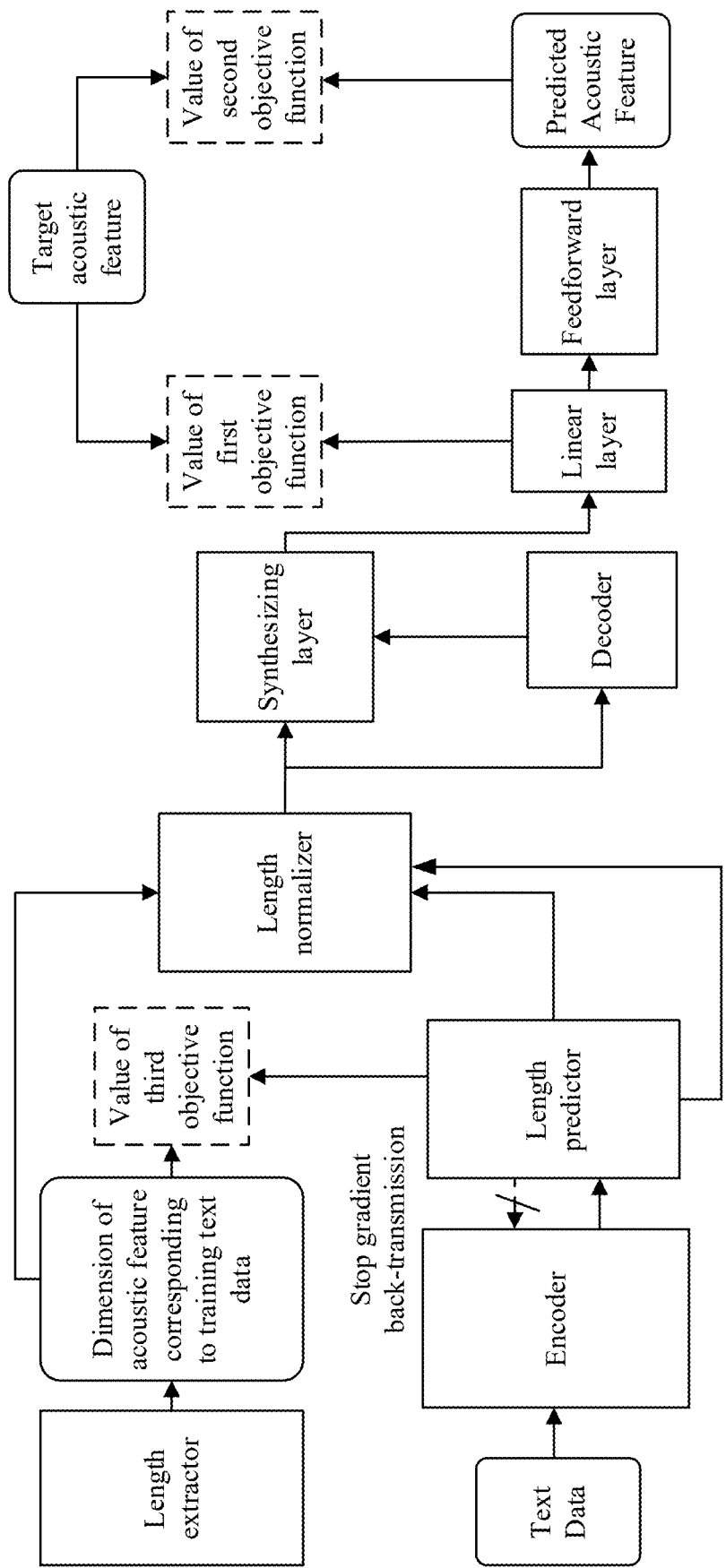
FIG. 10 is a schematic diagram showing yet another training process of an acoustic model according to an embodiment of the present disclosure.
Figure 11:
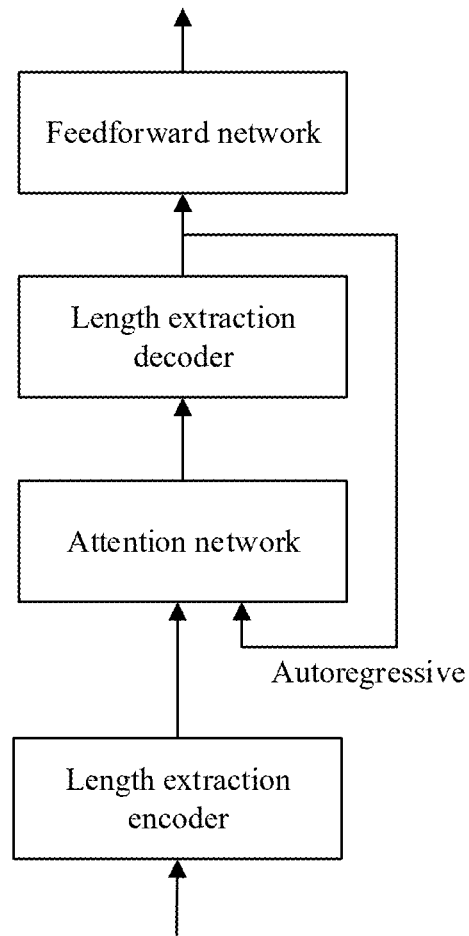
FIG. 11 is an exemplary structure of a length extractor according to an embodiment of the present disclosure.

FIG. 10 is a schematic diagram showing yet another training process of an acoustic model according to an embodiment of the present disclosure. FIG. 11 is an exemplary structure of a length extractor according to an embodiment of the present disclosure.

Referring to FIG. 10, training of the length predictor is assisted with the length extractor. An exemplary structure of the length extractor is as shown in FIG. 11. The length extractor is composed of a length extraction encoder, an attention network and a length extraction decoder. A time duration extracted by the length extractor is used for performing upsample on an output of the length extraction encoder to match the length of the target acoustic feature in the training process. An output of the length extractor is used as a learning tag of the length predictor. Furthermore, the length extractor is only configured to train the length predictor, instead of training the encoder 301, so that a decayed gradient will not be transmitted back to the encoder. In some embodiments, the length extraction decoder is a double-layer long short-term memory network (LSTM network) to better capture context information. In some embodiments, the length extractor may further include a feedforward network to adjust an output of the length extraction decoder.

In some embodiments, the length extraction encoder and the encoder are the same in structure, the decoder is a double-layer autoregressive recurrent neural network, and the length extractor is trained by utilizing the plurality of groups of training sample sets prior to the training of the length predictor. Training of the length extractor includes: generate a fine fusion text feature corresponding to at least one text data block in the training text data by utilizing the length extraction encoder in the length extractor; predict a length of an acoustic feature corresponding to the fine fusion text feature based on the fine fusion text feature by utilizing the attention network and the length extraction decoder; calculate a value corresponding to a fourth objective function based on the length of the acoustic feature corresponding to the training text data and the predicted length of the acoustic feature corresponding to the fine fusion text feature; and adjust a parameter of a neuron in the length extractor based on the value corresponding to the fourth objective function to converge the value corresponding to the fourth objective function.

In some embodiments, the fourth objective function indicates a similarity between the length of the acoustic feature corresponding to the training text data and the predicted length of the acoustic feature corresponding to the fine fusion text feature. That is, the training of the length extractor is a process of maximizing the similarity between the length of the target acoustic feature and the length of the predicted acoustic feature. The fourth objective function is also called a fourth loss function.

After the training of the length extractor is completed, the training of the length predictor may be further assisted. The length predictor is trained based on a plurality of groups of training sample sets, and each training sample in the plurality of groups of training sample sets includes training text data and a length of an acoustic feature corresponding to the training text data.

Training of the length predictor includes: generate a length of a target acoustic feature corresponding to at least one text data block in the training text data based on the training text data and the length of the acoustic feature corresponding to the training text data by utilizing the trained length extractor, generate a length of a predicted acoustic feature corresponding to the at least one text data block in the training text data based on the training text data by utilizing the length predictor, calculate a value corresponding to a third objective function based on the length of the target acoustic feature and the length of the predicted acoustic feature corresponding to the at least one text data block in the training text data, and adjust a parameter of a neuron in the length predictor based on the value corresponding to the third objective function to converge the value corresponding to the third objective function.

In some embodiments, the third objective function indicates a similarity between the length of the target acoustic feature and the length of the predicted acoustic feature. That is, the training of the length predictor is a process of maximizing the similarity between the length of the target acoustic feature and the length of the predicted acoustic feature. The third objective function is also called a third loss function.

Therefore, the acoustic model provided by the embodiment of the present disclosure is high in training convergence speed and good in prediction result.

Sound naturalness comparison between a loud reading APP applying the method of the embodiment of the present disclosure and a loud reading APP applying Fastspeech or Tacotron is shown below.

TABLE 1

Sound naturalness comparison

| Type of acoustic model | Mean opinion score (MOS) | | Comparison mean option score (CMOS) | |
|---|---|---|---|---|
| | Female voice | Male voice | Female voice | Male voice |
| Fastspeech | 4.10 ± 0.05 | 4.08 ± 0.06 | −0.336 | −0.363 |
| Tacotron | 4.20 ± 0.04 | 4.13 ± 0.06 | −0.245 | −0.311 |
| Acoustic model according to the embodiment of the present disclosure | 4.22 ± 0.04 | 4.23 ± 0.05 | 0.000 | 0.000 |

The mean opinion score (MOS) and the comparison mean option score (CMOS) are obtained based on the following manner. Two groups of people (5 people per group) with the native language being Chinese are invited for all MOS tests, 125 audios are listened each time and scored, 100 testing statements synthesized by corresponding models and 25 original recordings are mixed, and listeners do not know which category each audio belongs to. A scoring range is from 1 to 5, and 5 represents "completely natural speech". A final MOS is obtained from an average score of the two groups. In the table above, a number in front of the symbol ± represents a mean score of the two groups of testing personnel, and a number behind the symbol ± represents a variance.

For a CMOS test, the same listener is required to listen to paired testing statements synthesized by two different systems in a random order, and to assess their feelings of the latter compared with the former using scores with an interval of 1 in [−3, 3]. Taking the embodiment of the present disclosure as a benchmark, the scores of both Fastspeech and Tacotron are lower than those of the embodiment of the present disclosure.

It can be seen that the acoustic model according to the embodiment of the present disclosure fills up the naturalness gap of Fastspeech and Tacotron in two languages. Moreover, the listeners prefer the results synthesized by the embodiment of the present disclosure over the results synthesized by the other two systems. These results show that the embodiment of the present disclosure achieves competitive performance in terms of naturalness.

Comparison of word error rates (WER) between the loud reading APP applying the method of the embodiment of the present disclosure and the loud reading APP applying Fastspeech or Tacotron is shown below through Table 2 to measure the robustness of the embodiment of the present disclosure.

TABLE 2

Comparison of word error rate

| Type of acoustic model | Female voice | Male voice |
|---|---|---|
| Fastspeech | 2.8% | 4.1% |
| Tacotron-GMMA | 2.7% | 3.4% |
| Acoustic model according to the embodiment of the present disclosure | 2.0% | 2.1% |

The robustness may be evaluated by measuring a failure rate and/or the word error rate (WER). Model errors are mainly identified through whether a synthesized audio is ended in advance, whether the same segment is repeated and whether a meaningless segment which seriously affects content understanding is contained. In term of robustness, due to poor attention arrangement, the failure rates of Tacotron and GMM-based attention on two databases are 1.5% and 2.8% respectively. In a non-attention model, no serious synthesis failure occurs. Ordinary speech recognition performs recognition-according-to-shape on synthesized samples, and no serious failure occurs. According to the word error rate (WER) results recorded in Table 2, it shows that the embodiment of the present disclosure achieves the lowest word error rate regardless of whether training is performed using a studio-quality corpus or a challenging audio book corpus.

Sound naturalness comparison between the loud reading APP applying the method of the embodiment of the present disclosure and a loud reading APP applying other types is shown below through Table 3.

TABLE 3

Sound naturalness comparison

| Type of acoustic model | Mean opinion score | | Comparison mean option score | |
| --- | --- | --- | --- | --- |
| | Female voice | Male voice | Female voice | Male voice |
| A decoder in the acoustic model according to the embodiment of the present disclosure is replaced with an autoregressive decoder (ARD) | 4.11 ± 0.08 | 3.73 ± 0.07 | −0.349 | −0.694 |
| An encoder in the acoustic model according to the embodiment of the present disclosure is replaced with an RNN-based CBHG | 4.15 ± 0.06 | 4.01 ± 0.06 | −0.265 | −0.471 |
| Acoustic model according to the embodiment of the present disclosure | 4.22 ± 0.04 | 4.23 ± 0.05 | 0.000 | 0.000 |

Word error rate comparison between the loud reading APP applying the method of the embodiment of the present disclosure and the loud reading APP applying other types is shown below through Table 4.

TABLE 4

Comparison of word error rate

| Type of acoustic model | Female voice | Male voice |
| --- | --- | --- |
| A decoder in the acoustic model according to the embodiment of the present disclosure is replaced with an autoregressive decoder (ARD) | 2.3% | 4.4% |
| An encoder in the acoustic model according to the embodiment of the present disclosure is replaced with an RNN-based CBHG | 2.5% | 3.3% |
| Acoustic model according to the embodiment of the present disclosure | 2.0% | 2.1% |

As shown in Table 3, if the encoder 301 is replaced with the traditional RNN-based CBHG (convolutional bank, highway network and bidirectional gated recurrent unit) encoder, the MOS in the testing results will be lowered by 1.7% and 5.2% respectively. In term of the CMOS, the listeners prefer the results synthesized by the acoustic model of the embodiment of the present disclosure over the results obtained after replacement. As shown in Table 4, the WER value is higher due to the use of the CBHG encoder. It can be seen that, through coarse fusion processing and fine fusion processing, an output of the encoder 301 contains more language information. On the one hand, the encoder 301 helps to improve the naturalness, and on the other hand, the output of the encoder 301 is more suitable for the decoder based on the non-autoregressive RNN.

As shown in Table 3, if the decoder 303 based on the non-autoregressive RNN is replaced with the autoregressive decoder (ARD), the model obtained after replacement is obviously decreased in naturalness and robustness. Especially in the more challenging audio book corpus, in the testing results, there are obvious word skipping and pronunciation errors in some intra-field sentences. Therefore, the decoder 303 obviously reduces the error rate caused by exposure bias and local information preference of the autoregressive decoder.

Figure 12:
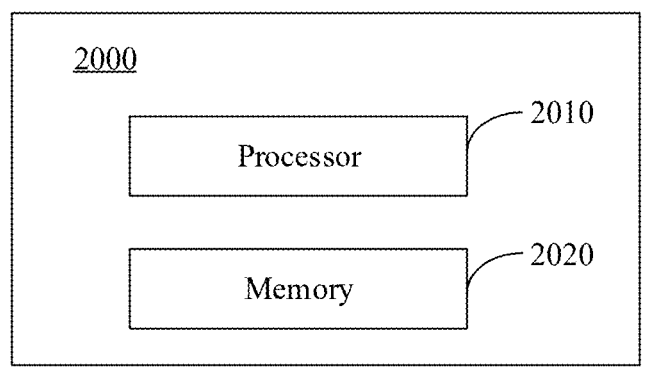
FIG. 12 shows a schematic diagram of an electronic device according to an embodiment of the present disclosure.

According to yet another aspect of the present disclosure, an electronic device is further provided to implement the method according to the embodiment of the present disclosure. FIG. 12 shows a schematic diagram of an electronic device 2000 according to an embodiment of the present disclosure.

As shown in FIG. 12, the electronic device 2000 may include one or more processors 2010 and one or more memories 2020. The memory 2020 stores computer-readable code. The computer-readable code, when run by the one or more processors 2010, may perform the foregoing method for transforming text data into an acoustic feature.

The processor in this embodiment of the present invention may be an integrated circuit chip and has a signal processing capability. The processor may be a general-purpose processor, a digital signal processor (DSP), an application-specific integrated circuit (ASIC), a field programmable gate array (FPGA), or another programmable logic device, discrete gate or transistor logic device, or discrete hardware assembly. The processor can implement or execute methods, steps, and logical block diagrams disclosed in the embodiments of this disclosure. The general-purpose processor may be a microprocessor, or the processor may be any related processor and the like, which may be of an X86 architecture or an ARM architecture.

The general-purpose processor may be a microprocessor, or the processor may be any related processor and the like, which may be of an X86 architecture or an ARM architecture. Some aspects can be implemented in hardware, while other aspects can be implemented in firmware or software executable by a controller, a microprocessor, or other computing devices. When various aspects of the embodiments of the present disclosure are illustrated or described as block diagrams, flowcharts, or represented by some other graphs, it should be understood that the blocks, apparatuses, systems, technologies, or methods described herein can be implemented, as non-restrictive examples, in hardware, software, firmware, a dedicated circuit or logic, general-purpose hardware or a controller or other computing devices, or some combinations thereof.

Figure 13:
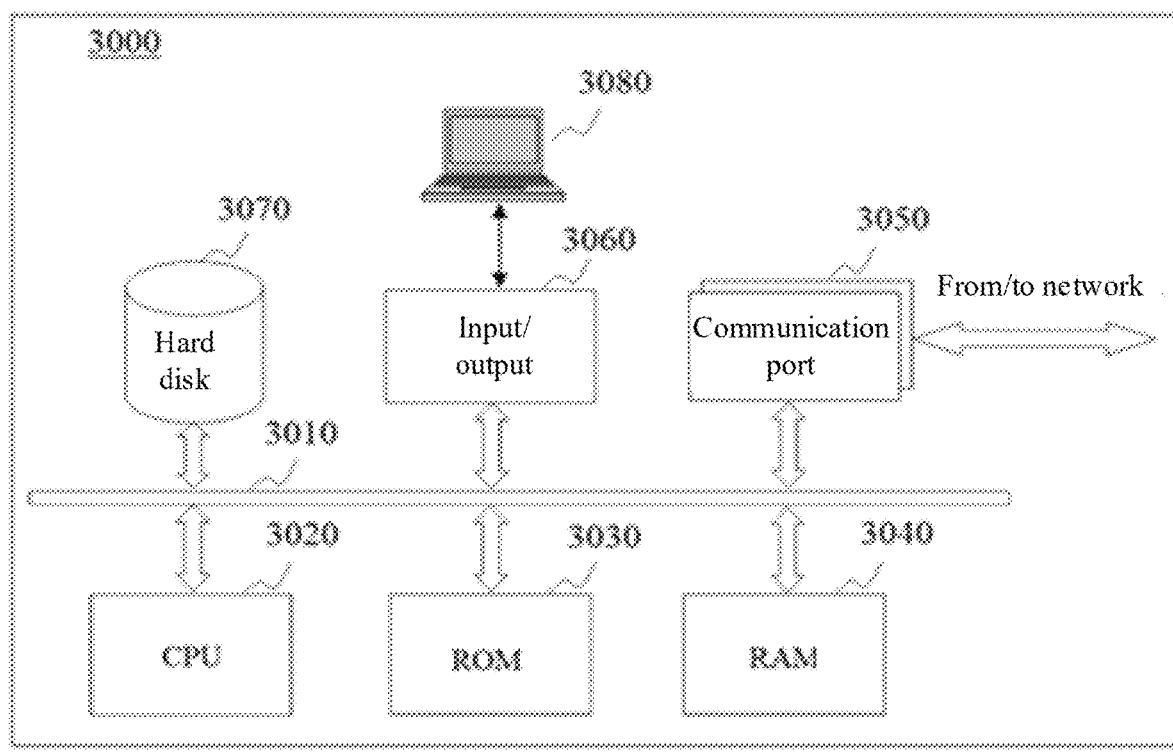
FIG. 13 shows a schematic diagram of an architecture of an exemplary computing device according to an embodiment of the present disclosure.

For example, the method or apparatus according to the embodiments of the present disclosure may alternatively be implemented by using an architecture of a computing device 3000 shown in FIG. 13. As shown in FIG. 13, the computing device 3000 may include a bus 3010, one or more CPU 3020, a read-only memory (ROM) 3030, a random access memory (RAM) 3040, a communication port 3050 connected to a network, an input/output component 3060, a hard disk 3070, and the like. A storage device, for example, the ROM 3030 or the hard disk 3070, in the computing device 3000 may store various data or files used in processing and/or communication in the method according to this disclosure and program instructions executed by the CPU. The computing device 3000 may further include a user interface 3080. Certainly, the architecture shown in FIG. 13 is only exemplary, and when different devices are implemented, one or more components in the computing device shown in FIG. 13 may be omitted according to an actual need.

Figure 14:
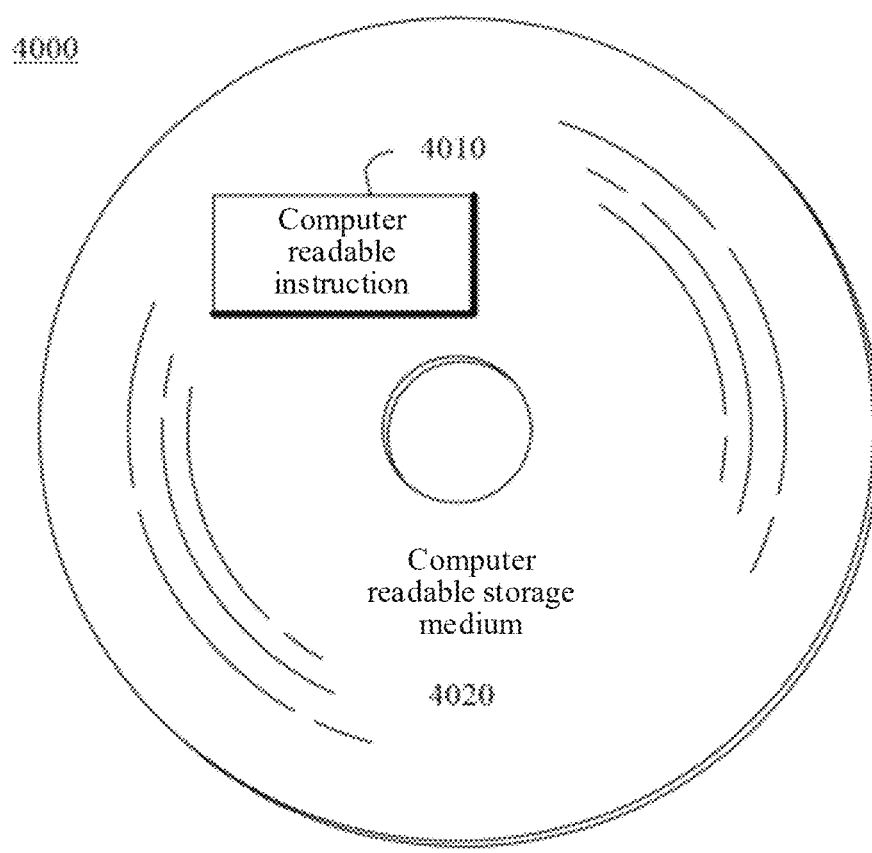
FIG. 14 is a schematic diagram of a storage medium according to an embodiment of the present disclosure.

According to still another aspect of the present disclosure, a computer-readable storage medium (e.g., a non-transitory computer-readable storage medium) is further provided. FIG. 14 is a schematic diagram 4000 of a storage medium according to the present disclosure.

As shown in FIG. 14, the computer storage medium 4020 stores computer-readable instructions 4010. The computer-readable instruction 400, when executed by a processor, may perform the method according to the embodiments of this disclosure described with reference to the foregoing accompanying drawings. The computer-readable storage medium in the embodiments of this disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. For example but not for limitation, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM). The memory of the method described herein aims to include but not limited to these memories and any other suitable types of memories. The memory of the method described herein aims to include but not limited to these memories and any other suitable types of memories.

The embodiments of the present disclosure provide a computer program product or a computer program. The computer program product or the computer program includes computer instructions, and the computer instructions are stored in a computer-readable storage medium. A processor of a computer device reads the computer instructions from the computer-readable storage medium (e.g., a non-transitory computer-readable storage medium) and executes the computer instructions to cause the computer device to perform the method according to the embodiments of this disclosure.

Flowcharts and block diagrams in the drawings illustrate architectures, functions, and operations that may be implemented by using the system, the method, and the computer program product according to the various embodiments of the present disclosure. In this regard, each box in a flowchart or a block diagram may represent a module, a program segment, or a part of code. The module, the program segment, or the part of code includes one or more executable instructions used for implementing specified logic functions. The module, the program segment, or the part of code can be implemented by processing circuitry, software, or a combination thereof, for example. In some implementations used as substitutes, functions annotated in boxes may alternatively occur in a sequence different from that annotated in an accompanying drawing. For example, two boxes shown in succession may be performed basically in parallel, and sometimes the two boxes may be performed in a reverse sequence. This is determined by a related function. Each block in the block diagram and/or the flowchart, and a combination of blocks in the block diagram and/or the flowchart, may be implemented by using a specific hardware-based system that performs specified functions or operations, or may be implemented by using a combination of special-purpose hardware and computer instructions.

In general, various exemplary embodiments of the present disclosure can be implemented in hardware or a dedicated circuit, software, firmware, logic, or any combination thereof. Some aspects can be implemented in hardware, while other aspects can be implemented in firmware or software executable by a controller, a microprocessor, or other computing devices. When various aspects of the embodiments of the present disclosure are illustrated or described as block diagrams, flowcharts, or represented by some other graphs, it should be understood that the blocks, apparatuses, systems, technologies, or methods described herein can be implemented, as non-restrictive examples, in hardware, software, firmware, a dedicated circuit or logic, general-purpose hardware or a controller or other computing devices, or some combinations thereof.

The exemplary embodiments of the present disclosure described above in detail are illustrative only but not restrictive. A person skilled in the art may understand that, various modifications and combinations may be made to the embodiments and features thereof without departing from the principle and spirit of the present disclosure, and such modifications shall fall within the scope of the present disclosure.

The invention claimed is:

1. A method for transforming text data into an acoustic feature based on an acoustic apparatus, the method comprising:
   generating a concealed text feature corresponding to a text data block of a plurality of text data blocks included in the text data and at least one concealed text feature corresponding to at least one text data block subsequent to the text data block, the concealed text feature corresponding to the text data block being a feature vector that is an output of an intermediate layer of a neural network of the acoustic apparatus and indicates a text feature of the text data block;
   performing a coarse fusion on the concealed text feature corresponding to the text data block and the at least one concealed text feature corresponding to the at least one text data block subsequent to the text data block to obtain at least one coarse fusion text feature, the coarse fusion being performed based on a linear processing;
   performing a fine fusion on the at least one coarse fusion text feature to obtain a fine fusion text feature corresponding to the text data block, the fine fusion being performed based on at least one trainable hidden layer of the neural network of the acoustic apparatus;
   regulating a length corresponding to the fine fusion text feature based on a length of the acoustic feature such that the length corresponding to the fine fusion text feature matches the length of the acoustic feature; and transforming the fine fusion text feature with the regulated length into the acoustic feature.

2. The method according to claim 1, wherein:
the concealed text feature corresponding to the text data block is fused with first prediction information and second prediction information of the text data block,
the first prediction information is predicted based on the text data block, and
the second prediction information is predicted based on the at least one text data block subsequent to the text data block.

3. The method according to claim 2, wherein:
the first prediction information includes at least one of pinyin information, phoneme information, semantic information, or emotion information extracted based on the text data block; and
the second prediction information includes at least one of emotion information or speech rate information extracted based on the at least one text data block subsequent to the text data block.

4. The method according to claim 1, wherein the coarse fusion is executed by an encoder of the acoustic apparatus that includes N transformers and N adders; and
the performing the coarse fusion further comprises:
generating N coarse fusion text features based on the concealed text feature corresponding to the text data block and the at least one concealed text feature corresponding to the at least one text data block subsequent to the text data block by utilizing the N transformers and the N adders, N being a positive integer.

5. The method according to claim 1, wherein the performing the fine fusion on the at least one coarse fusion text feature comprises:
predicting the fine fusion text feature corresponding to the text data block based on a query feature, a value feature, and a key feature, one or more coarse fusion text features in the at least one coarse fusion text feature being the query feature, and the concealed text feature corresponding to the text data block and the at least one concealed text feature corresponding to the at least one text data block subsequent to the text data block being the value feature and the key feature respectively.

6. The method according to claim 1, wherein:
the coarse fusion and the fine fusion are executed by an encoder of the acoustic apparatus,
the encoder includes N transformers, N adders, and a multi-head attention layer,
an output of an $n^{th}$ transformer of the N transformers and an output of an $(n-1)^{th}$ adder of the N adders are both connected to an input of an $n^{th}$ adder of the N adders,
an output of the $n^{th}$ adder of the N adders is connected to an input of an $(n+1)^{th}$ transformer of the N transformers,
an input of the multi-head attention layer includes outputs of the N transformers and the output of the $n^{th}$ adder of the N adders,
each of the N transformers outputs a respective concealed text feature, each of the N adders outputs a respective coarse fusion text feature, and the multi-head attention layer of the encoder outputs the fine fusion text feature corresponding to the text data block, and
n is greater than or equal to 1 but less than or equal to N, and N is a positive integer greater than 1.

7. The method according to claim 1, wherein the regulating the length corresponding to the fine fusion text feature is executed by a length regulator of the acoustic apparatus, and the regulating the length corresponding to the fine fusion text feature further comprises:
predicting the length of the acoustic feature corresponding to the fine fusion text feature by utilizing a length predictor in the length regulator; and
regulating the length corresponding to the fine fusion text feature to generate the fine fusion text feature with the regulated length based on the length of the acoustic feature corresponding to the fine fusion text feature and the fine fusion text feature by utilizing a length normalizer in the length regulator.

8. The method according to claim 7, wherein:
the length predictor comprises a plurality of one-dimensional convolutional neural networks in series, a bidirectional gated recurrent unit, and a first linear layer,
each of the plurality of one-dimensional convolutional neural networks is configured to extract a respective relative position feature in the fine fusion text feature, the respective relative position feature representing respective relative position information of the text data block in the text data;
the bidirectional gated recurrent unit is configured to generate a global context feature based on relative position features; and
the first linear layer is configured to generate the length of the acoustic feature corresponding to the fine fusion text feature based on the global context feature.

9. The method according to claim 8, wherein a number of the plurality of one-dimensional convolutional neural networks in series is K, K being greater than zero, and
the predicting the length of the acoustic feature corresponding to the fine fusion text feature further comprises:
extracting a first relative position feature of the fine fusion text feature by feeding the fine fusion text feature to a first one-dimensional convolutional neural network of the plurality of one-dimensional convolutional neural networks;
generating a $K^{th}$ relative position feature by feeding the first relative position feature to a subset of the plurality of one-dimensional convolutional neural networks that include a second one-dimensional convolutional neural network to a $K^{th}$ one-dimensional convolutional neural network, the $K^{th}$ relative position feature being generated by feeding a $(K-1)^{th}$ relative position feature that is generated by a $(K-1)^{th}$ one-dimensional convolutional neural network to the $K^{th}$ one-dimensional convolutional neural network;
generating the global context feature based on the $K^{th}$ relative position feature by utilizing the bidirectional gated recurrent unit; and
generating the length of the acoustic feature corresponding to the fine fusion text feature based on the global context feature by utilizing the first linear layer.

10. The method according to claim 9, wherein:
the fine fusion text feature with the regulated length is transformed into the acoustic feature by utilizing a decoder of the acoustic apparatus,
the decoder is a single-layer non-autoregressive recurrent neural network, an input of the decoder being the fine fusion text feature with the regulated length, and
an output of the decoder is the acoustic feature.

11. The method according to claim 10, further comprising:
combining a plurality of acoustic features corresponding to the plurality of text data blocks to generate a combined acoustic feature by utilizing a synthesizing layer of the acoustic apparatus; and performing a first adjustment on the combined acoustic feature by utilizing a second linear layer of the acoustic apparatus.

12. The method according to claim 11, further comprising:

performing a second adjustment on the first-adjusted combined acoustic feature by utilizing a postprocessing network of the acoustic apparatus, and transforming the second-adjusted combined acoustic feature into an audio data output by utilizing a vocoder of the acoustic apparatus.

13. The method according to claim 12, wherein:

the coarse fusion and the fine fusion are executed by an encoder of the acoustic apparatus, the encoder, the decoder, the synthesizing layer, and the second linear layer are trained based on a plurality of training sample sets, each training sample in the plurality of training sample sets includes respective training text data and a respective target acoustic feature corresponding to the respective training text data, and the training the encoder, the decoder, the synthesizing layer, and the second linear layer further comprises:

transforming the training text data into the first-adjusted combined acoustic feature by utilizing the encoder, the decoder, the synthesizing layer, and the second linear layer, calculating a value corresponding to a first objective function based on the first-adjusted combined acoustic feature and the target acoustic features corresponding to the training text data, and adjusting parameters of neurons in the encoder, the decoder, the synthesizing layer, and the second linear layer based on the value corresponding to the first objective function to converge the value corresponding to the first objective function.

14. The method according to claim 12, wherein:

the coarse fusion and the fine fusion are executed by an encoder of the acoustic apparatus, the encoder, the decoder, the synthesizing layer, the second linear layer and the postprocessing network are trained based on a plurality of training sample sets, each training sample in the plurality of training sample sets includes respective training text data and a respective target acoustic feature corresponding to the respective training text data, and the training the encoder, the decoder, the synthesizing layer, the second linear layer, and the postprocessing network further comprises:

transforming the training text data into the second-adjusted combined acoustic feature by utilizing the encoder, the decoder, the synthesizing layer, the second linear layer, and the postprocessing network, calculating a value corresponding to a second objective function based on the second-adjusted combined acoustic feature and the target acoustic features corresponding to the training text data, and adjusting parameters of neurons in the encoder, the decoder, the synthesizing layer, the second linear layer, and the postprocessing network based on the value corresponding to the second objective function to converge the value corresponding to the second objective function.

15. The method according to claim 7, further comprising:

training the length predictor based on a plurality of training sample sets, each training sample in the plurality of training sample sets comprising respective training text data and a length of a respective acoustic feature corresponding to the respective training text data, and the training the length predictor further comprises:

generating a length of a target acoustic feature corresponding to at least one text data block in a training text data of the plurality of training sample sets based on the training text data and a length of an acoustic feature corresponding to the training text data by utilizing a trained length extractor of the acoustic apparatus;

generating a length of a predicted acoustic feature corresponding to the at least one text data block in the training text data based on the training text data by utilizing the length predictor;

calculating a value corresponding to a third objective function based on the length of the target acoustic feature and the length of the predicted acoustic feature corresponding to the at least one text data block in the training text data; and adjusting a parameter of a neuron in the length predictor based on the value corresponding to the third objective function to converge the value corresponding to the third objective function.

16. The method according to claim 15, wherein:

the length extractor comprises a length extraction encoder, an attention network, and a length extraction decoder, the length extraction encoder is a double-layer autoregressive recurrent neural network, the length extractor is trained by utilizing the plurality of training sample sets before the length predictor is trained, and the training the length extractor further comprises:

generating a fine fusion text feature corresponding to the at least one text data block in the training text data by utilizing the length extraction encoder in the length extractor;

predicting a length of an acoustic feature corresponding to the fine fusion text feature based on the fine fusion text feature by utilizing the attention network and the length extraction decoder;

calculating a value corresponding to a fourth objective function based on the length of the acoustic feature corresponding to the training text data and the predicted length of the acoustic feature corresponding to the fine fusion text feature; and adjusting a parameter of a neuron in the length extractor based on the value corresponding to the fourth objective function to converge the value corresponding to the fourth objective function.

17. An apparatus for transforming text data into an acoustic feature, the apparatus comprising:

processing circuitry configured to:

generate a concealed text feature corresponding to a text data block of a plurality of text data blocks included in the text data and at least one concealed text feature corresponding to at least one text data block subsequent to the text data block, the concealed text feature corresponding to the text data block being a feature vector that is an output of an intermediate layer of a neural network of the apparatus and indicates a text feature of the text data block;

perform a coarse fusion on the concealed text feature corresponding to the text data block and the at least one concealed text feature corresponding to the at least one text data block subsequent to the text data block to obtain at least one coarse fusion text feature, the coarse fusion being performed based on a linear processing;

perform a fine fusion on the at least one coarse fusion text feature to obtain a fine fusion text feature corresponding to the text data block, the fine fusion being performed based on at least one trainable hidden layer of the neural network of the apparatus;

regulate a length corresponding to the fine fusion text feature based on a length of the acoustic feature such that the length corresponding to the fine fusion text feature matches the length of the acoustic feature; and transform the fine fusion text feature with the regulated length into the acoustic feature.

18. The apparatus according to claim 17, wherein:

the concealed text feature corresponding to the text data block is fused with first prediction information and second prediction information of the text data block, the first prediction information is predicted based on the text data block, and the second prediction information is predicted based on the at least one text data block subsequent to the text data block.

19. The apparatus according to claim 18, wherein:

the first prediction information includes at least one of pinyin information, phoneme information, semantic information, or emotion information extracted based on the text data block, and the second prediction information includes at least one of emotion information or speech rate information extracted based on the at least one text data block subsequent to the text data block.

20. The apparatus according to claim 17, wherein the coarse fusion is executed by an encoder of the apparatus that includes N transformers and N adders; and the processing circuitry is configured to:

generate N coarse fusion text features based on the concealed text feature corresponding to the text data block and the at least one concealed text feature corresponding to the at least one text data block subsequent to the text data block by utilizing the N transformers and the N adders, N being a positive integer.

* * * * *